US012812028B2

(12) United States Patent
Ben Moshe et al.

(10) Patent No.: US 12,812,028 B2
(45) Date of Patent: Nov. 24, 2026

(54) DEADLOCK-RESILIENT LOCK MECHANISM FOR REDUCTION OPERATIONS

(71) Applicant: MELLANOX TECHNOLOGIES, LTD., Yokneam (IL)

(72) Inventors: Ortal Ben Moshe, Ein HaEmek (IL); Richard Leigh Graham, Knoxville, TN (US); Itamar Rabenstein, Petah Tikva (IL); Lion Levi, Yavne (IL)

(73) Assignee: Mellanox Technologies, Ltd., Yokneam (IL)

( * ) Notice: Subject to any disclaimer, the term of this patent is extended or adjusted under 35 U.S.C. 154(b) by 309 days.

(21) Appl. No.: 18/547,093

(22) PCT Filed: May 26, 2022

(86) PCT No.: PCT/IB2022/000292

§ 371 (c)(1),
(2) Date: Aug. 18, 2023

(87) PCT Pub. No.: WO2022/254253

PCT Pub. Date: Dec. 8, 2022

(65) Prior Publication Data

US 2025/0088577 A1 Mar. 13, 2025

Related U.S. Application Data

(60) Provisional application No. 63/195,070, filed on May 31, 2021.

(51) Int. Cl.
*H04L 69/40* (2022.01)
*H04L 67/10* (2022.01)
(Continued)

(52) U.S. Cl.
CPC .............. *H04L 69/40* (2013.01); *H04L 67/10* (2013.01); *H04L 67/55* (2022.05); *H04L 67/61* (2022.05)

(58) Field of Classification Search
CPC ......... H04L 69/40; H04L 67/61; H04L 67/55; H04L 67/10; H04L 67/566; H04L 67/1396; H04L 47/829; H04L 47/827
See application file for complete search history.

(56) References Cited

U.S. PATENT DOCUMENTS 8,510,538 B1 * 8/2013 Malewicz ............. G06F 16/278 712/225
10,284,383 B2 * 5/2019 Bloch ..................... H04L 12/44
(Continued)

FOREIGN PATENT DOCUMENTS

CN 106776720 A * 5/2017 ............. G06F 16/17
CN 111258976 A * 6/2020
(Continued)

OTHER PUBLICATIONS

International Preliminary Report on Patentability for International (PCT) Patent Application No. PCT/IB2022/000292, dated Dec. 14, 2023 10 pages.
(Continued)

*Primary Examiner* — Shean Tokuta
(74) *Attorney, Agent, or Firm* — Sheridan Ross P.C.

(57) ABSTRACT

A source network device may transmit a lock request including a request for a network element to allocate resources in association with an operation of a reduction tree. The source network device may transmit collision information associated with the lock request in response to receiving a lock failure notification indicating that one or more network elements have failed to allocate the resources. A network element may receive, from one or more child nodes, lock requests defined for a data-reduction operation
(Continued)

associated with a data-reduction flow. The network element may propagate a received lock request to a parent node. A root network device may transmit a lock command to network elements of a reduction tree. The lock command includes a request for an allocation of resources. The root network device may transmit collision information associated with the lock command in response to receiving a lock failure notification.

19 Claims, 22 Drawing Sheets

(51) Int. Cl.
*H04L 67/55* (2022.01)
*H04L 67/61* (2022.01)

(56) References Cited

U.S. PATENT DOCUMENTS

| | | | | |
|---|---|---|---|---|
| 10,521,283 | B2 | 12/2019 | Shuler et al. | |
| 11,088,916 | B1 | 8/2021 | Chandrashekhar et al. | |
| 11,252,027 | B2 | 2/2022 | Ben-Moshe et al. | |
| 11,789,792 | B1 | 10/2023 | Graham | |
| 2002/0194523 | A1 | 12/2002 | Ulrich et al. | |
| 2004/0034642 | A1 | 2/2004 | Szilagyi et al. | |
| 2004/0220933 | A1 | 11/2004 | Walker | |
| 2007/0180083 | A1 | 8/2007 | Adam et al. | |
| 2014/0173135 | A1* | 6/2014 | Varney | H04L 41/50 709/245 |
| 2015/0039575 | A1* | 2/2015 | Helak | G06F 16/21 707/696 |
| 2015/0186450 | A1* | 7/2015 | Peleg | G06F 9/466 707/690 |
| 2018/0159774 | A1* | 6/2018 | Aggarwal | H04L 67/60 |
| 2018/0324129 | A1 | 11/2018 | Varadarajan et al. | |
| 2020/0106828 | A1 | 4/2020 | Elias et al. | |
| 2020/0265043 | A1 | 8/2020 | Graham et al. | |
| 2020/0348965 | A1* | 11/2020 | Chenxi | G06N 3/098 |
| 2021/0224051 | A1* | 7/2021 | Bequet | G06F 9/45533 |
| 2023/0084918 | A1 | 3/2023 | Wiegman | |
| 2023/0353635 | A1* | 11/2023 | Karumbunathan | H04L 67/1097 |
| 2025/0088577 | A1* | 3/2025 | Ben Moshe | H04L 67/1396 |

FOREIGN PATENT DOCUMENTS

| | | | | |
|---|---|---|---|---|
| CN | 111597193 A * | 8/2020 | G06F 16/2365 |
| WO | WO-2022254253 A2 * | 12/2022 | H04L 67/1396 |
| WO | WO-2022254253 A3 * | 12/2022 | |

OTHER PUBLICATIONS

"MPI: A Message-Passing Interface Standard," University of Tennessee, Jun. 9, 2021, Version 4.0, 1139 pages.

Faraj et al. "Automatic Generation and Tuning of MPI Collective Communication Routines," ICS '05: Proceedings of the 19th annual international conference on Supercomputing, Jun. 2005, pp. 393-402.

Gropp et al. "The MPI Message-Passing Interface Standard: Overview and Status," Advances in Parallel Computing, 1995, vol. 10, pp. 265-269 (Abstract only).

Leiserson "Fat-trees: universal networks for hardware -efficient supercomputing," IEEE Transactions on Computers, Oct. 1985, vol. 34, pp. 892-901 (Abstract only).

Zheng et al. "Simulation of the performance and scalability of message passing interface (MPI) communications of atmospheric models running on exascale supercomputers," Geoscientific Model Development, Aug. 2018, vol. 11, No. 8, pp. 3409-3426.

Invitation to Pay Additional Fees for International (PCT) Patent Application No. PCT/IB22/00292, dated Aug. 30, 2022 2 pages.

Notice of Allowance for U.S. Appl. No. 17/825,085, dated Aug. 16, 2023, 10 pages.

Graham et al. "Scalable Hierarchical Aggregation and Reduction Protocol (SHARP)™ Streaming-Aggregation Hardware Design and Evaluation," High Performance Computing, May 2020, 12151, pp. 41-59.

Extended Search Report for European Patent Application No. 22815429.0, dated Mar. 3, 2025, 12 pages.

International Search Report prepared by the United States Patent Office on Oct. 16, 2022, for International Application No. PCT/IB/2022/000292, 4 pgs.

Written Opinion prepared by the United States Patent Office on Oct. 16, 2022, for International Application No. PCT/IB/2022/000292, 8 pgs.

* cited by examiner

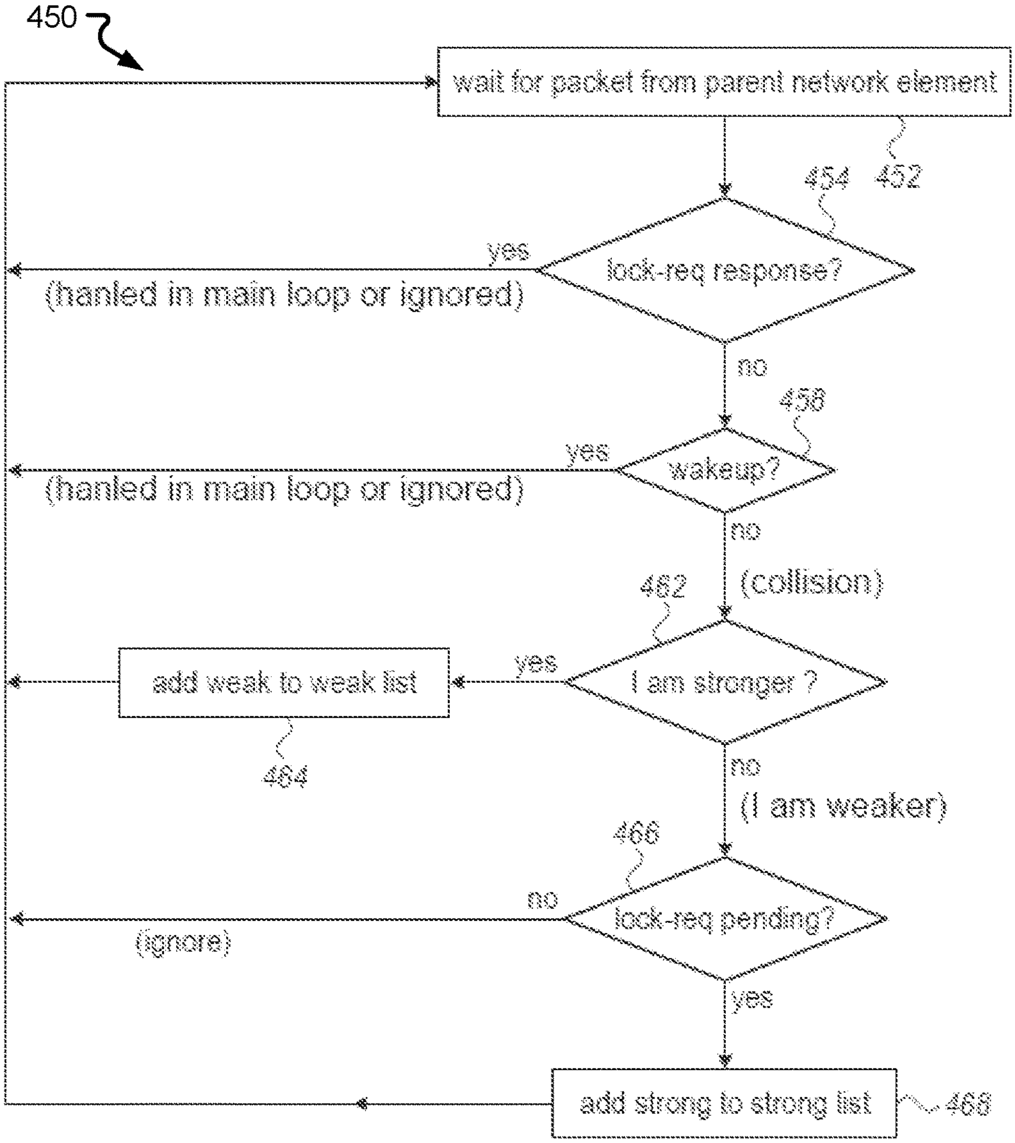
Fig. 4B Source network device flowchart-response to packet from parent network element
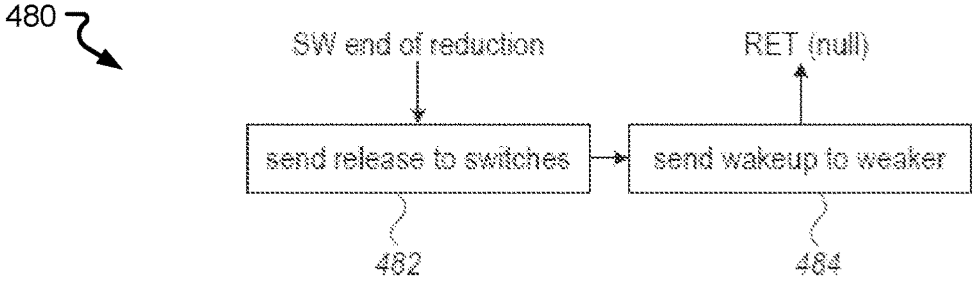
Fig. 4C Source network device flowchart-end of reduction

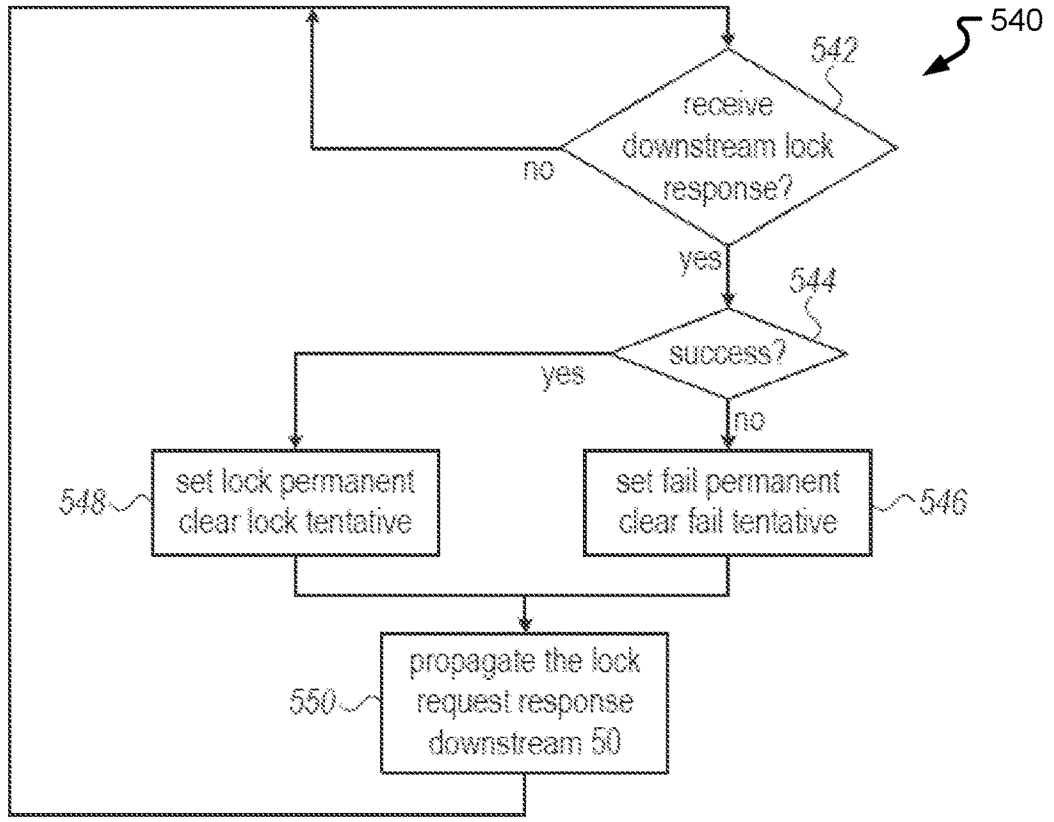
*Fig. 5B* Network Element Lock-Request-Response Flowchart
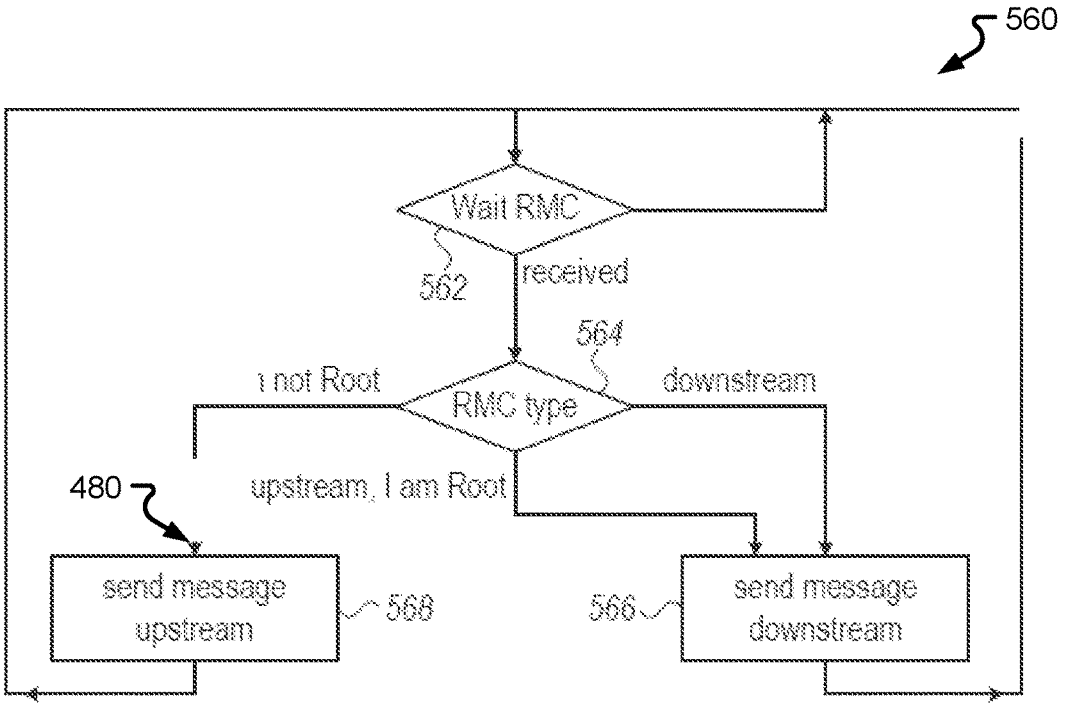
*Fig. 5C* Network Element Reliable Multicast (RMC) Flowchart

1300

DEADLOCK-RESILIENT LOCK MECHANISM FOR REDUCTION OPERATIONS

CROSS-REFERENCE TO RELATED APPLICATIONS

The present application is a national stage application under 35 U.S.C. 371 and claims the benefit of PCT Application No. PCT/IB2022/000292 having an international filing date of 26 May 2022, which designated the United States, and which PCT application claims the benefit of priority under 35 U.S.C. § 119 (e) to U.S. Provisional Application Ser. No. 63/195,070, filed 31 May 2021. The entire disclosures of the applications listed are hereby incorporated by reference, in their entirety, for all that each disclosure teaches and for all purposes.

FIELD OF TECHNOLOGY

The present disclosure relates generally to distributed computing, and particularly to methods and apparatuses for efficient data reduction in distributed network computing.

BACKGROUND

A distributed computing system may be defined as a system whose components are located on different networked computers, which communicate and coordinate their actions by passing messages to one another.

Methods for distributing a computation among multiple network elements are known in the art. For example, U.S. Pat. No. 10,284,383, the entire disclosure of which is incorporated herein by reference, describes a switch in a data network, configured to mediate data exchanges among network elements. The switch further includes a processor, which organizes the network elements into a hierarchical tree having a root node network element, vertex node network elements, and child node network elements that include leaf node network elements. The leaf node network elements originate aggregation data and transmit the aggregation data to respective parent vertex node network elements. The vertex node network elements combine the aggregation data from at least a portion of the child node network elements and transmit the combined aggregation data from the vertex node network elements to parent vertex node network elements. The root node network element is operative for initiating a reduction operation on the aggregation data.

The terms “root node network element”, “root node”, “root network element”, and “root” may be used interchangeably herein. The terms “leaf node network element”, “leaf node”, “leaf network element”, and “leaf” may be used interchangeably herein. A leaf node network element may refer to a node at the bottom of a tree hierarchy. Each leaf node network element may maintain a list of lock requests that failed, aspects of which are later described herein. That is, for example, each leaf node network element may maintain a list of pending lock requests, aspects of which are later described herein.

U.S. Pat. No. 10,521,283, the entire disclosure of which is incorporated herein by reference, describes a Message-Passing Interface (MPI) collective operation that is carried out in a fabric of network elements by transmitting MPI messages from all the initiator processes in an initiator node to designated responder processes in respective responder nodes, wherein respective payloads of the MPI messages are combined in a network interface device of the initiator node to form an aggregated MPI message, the aggregated MPI message is transmitted through the fabric to network interface devices of responder nodes, disaggregating the aggregated MPI message into individual messages, and distributing the individual messages to the designated responder node processes. Aspects of the present disclosure may implement one or more network interfaces that support collective operations such as, for example, OpenSHMEM, UPC, and user-defined reductions independent of a formal specification.

The present disclosure will be more fully understood from the following detailed description of the embodiments thereof, taken together with the drawings herein.

SUMMARY

Example aspects of the present disclosure include:

A source network device, including: one or more ports configured for exchanging communication packets with a set of network elements over a network; and one or more circuits to: transmit a lock request, wherein the lock request includes a request for at least one network element of the set of network elements to allocate resources in association with an operation of the reduction tree; and transmit collision information associated with the lock request in response to receiving a lock failure notification, wherein the lock failure notification indicates that one or more network elements of the set of network elements have failed to allocate the resources.

Any of the aspects herein, wherein the one or more circuits, in response to receiving the lock failure notification: add the lock request to a set of pending lock requests; retransmit the lock request based on a priority order associated with the pending lock requests; and exchange the communication packets with the set of network elements in response to a result associated with retransmitting the lock request.

Any of the aspects herein, wherein the one or more circuits transmit an additional lock request for the operation in response to: receiving the lock failure notification; and a preset criterion associated with sending one or more additional lock requests.

Any of the aspects herein, wherein the collision information includes at least one of: an identifier corresponding to the lock request; and an identifier corresponding to a network element from which the source network device received the lock failure notification.

Any of the aspects herein, wherein: the collision information includes an indication of an existing lock of the resources; and the existing lock corresponds to a second lock request received from a network element of the set of network elements.

Any of the aspects herein, wherein the collision information includes at least one of: an identifier corresponding to the second lock request; an identifier corresponding to the network element; and status information associated with the existing lock.

Any of the aspects herein, wherein the collision information includes an indication of at least one of: an operation associated with the existing lock, wherein the operation is a data reduction operation associated with the reduction tree or a second reduction tree; and a data reduction flow including the operation.

Any of the aspects herein, wherein the one or more circuits: receive a collision indication indicating: a collision between a first lock request for a set of resources and a second lock request for the set of resources, wherein the first lock request is from a first data flow, and the second lock request is from a second data flow; and a result of the collision, wherein the result includes a denial of the first lock request; and store an identifier corresponding to the first data reduction flow, in response to receiving the collision indication, wherein the identifier is stored to a list of data reduction flows for which a corresponding lock request was denied at least one previous lock request.

A network element, including: one or more ports for exchanging communication packets over a network; a processor, to perform data-reduction operations, wherein each data-reduction operation is associated with a plurality of source network devices and a plurality of network elements of the network that are arranged in a respective data-reduction flow; a computation hierarchy database operable to indicate, for each data-reduction flow in which the network element participates, one or more child nodes and a parent node of the network element; and one or more circuits to: receive, from the one or more child nodes, lock requests defined for a data-reduction operation associated with a data-reduction flow; aggregate the received lock requests; and in response to aggregating the received lock requests, propagate a lock request to the parent node.

Any of the aspects herein, wherein the one or more circuits receive from the parent node, in response to propagating the lock request, one of (i) a lock-success message and (ii) a lock-failure message.

Any of the aspects herein, wherein the one or more circuits, in response to receiving the lock-success message: apply a lock in favor of the data-reduction operation; and transmit the lock-success message to the one or more child nodes.

Any of the aspects herein, wherein the one or more circuits, in response to receiving the lock-failure message, transmit the lock-failure message to one or more of the child nodes.

Any of the aspects herein, wherein, in response to receiving a lock request from the one or more child nodes, the one or more circuits: verify whether a lock has been acquired in favor of a data reduction operation of a flow that is different from the flow associated with the received lock request; and in response to verifying that the lock exists, indicate a lock-failure to the parent node.

Any of the aspects herein, wherein, in response to receiving a lock request from the one or more child nodes, the one or more circuits: verify whether a previous lock request was received for a flow that is different from the flow associated with the received lock request; and in response to verifying that the previous lock request was received, transmit a collision indication to the parent node.

Any of the aspects herein, wherein the one or more circuits transmit a lock-fail count with the collision indication.

Any of the aspects herein, further including at least one group of computation resources, wherein the one or more circuits: tentatively allocate the at least one group of computation resources to the lock request in response to receiving a lock-request message; in response to receiving a lock-success message associated with the lock request, permanently allocate the tentatively allocated group of computation resources to the lock request; and in response to receiving a lock-failure message associated with the lock request, release a lock associated with the tentatively allocated group of computation resources.

A root network device, including: one or more ports configured for exchanging communication packets with a set of network elements over a network; and one or more circuits to: transmit a lock command in response to receiving a lock request from a network element of the set of network elements, wherein: the set of network elements are included in a reduction tree associated with the network; and the lock command includes a request for the network element or at least one other network element of the set of network elements to allocate resources in association with an operation of the reduction tree; and transmit collision information associated with the lock command in response to receiving a lock failure notification from the network element.

Any of the aspects herein, wherein the one or more circuits: transmit a release command, wherein the release command includes a request for the network element or the at least one other network element of the set of network elements to release the resources in association with the operation of the reduction tree.

Any of the aspects herein, wherein the lock failure notification includes an indication that one or more network elements of the set of network elements have failed to allocate the resources.

Any of the aspects herein, wherein: the one or more circuits transmit, in response to completion of the operation, a second lock command associated with a second network element and at least one failed lock request; and transmitting the second lock command is based on a priority of the second network element with respect to respective priorities of other network elements associated with failed lock requests.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/implementations in combination with any one or more other aspects/features/implementations.

Use of any one or more of the aspects or features as disclosed herein.

It is to be appreciated that any feature described herein can be claimed in combination with any other feature(s) as described herein, regardless of whether the features come from the same described implementation.

The details of one or more aspects of the disclosure are set forth in the accompanying drawings and the description below. Other features, objects, and advantages of the techniques described in this disclosure will be apparent from the description and drawings, and from the claims.

The preceding is a simplified summary of the disclosure to provide an understanding of some aspects of the disclosure. This summary is neither an extensive nor exhaustive overview of the disclosure and its various aspects, implementations, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, implementations, and configurations of the disclosure are possible utilizing, alone or in combination, one or more of the features set forth above or described in detail below.

Numerous additional features and advantages of the present disclosure will become apparent to those skilled in the art upon consideration of the implementation descriptions provided hereinbelow.

BRIEF DESCRIPTION OF THE DRAWINGS

FIG. 4B is a flowchart that schematically illustrates a method for responding to a packet from a parent network element by a source network device, in accordance with some embodiments of the present disclosure.

FIG. 4C is a flowchart that schematically illustrates a method for exit from reduction by a source network device, in accordance with some embodiments of the present disclosure.

FIG. 5B is a flowchart that schematically illustrates a method for lock-request response handling by a network element, in accordance with some embodiments of the present disclosure.

FIG. 5C is a flowchart that schematically illustrates a method for Reliable Multicast (RMC) propagation by a network element, in accordance with some embodiments of the present disclosure.

DETAILED DESCRIPTION

Figure 1:
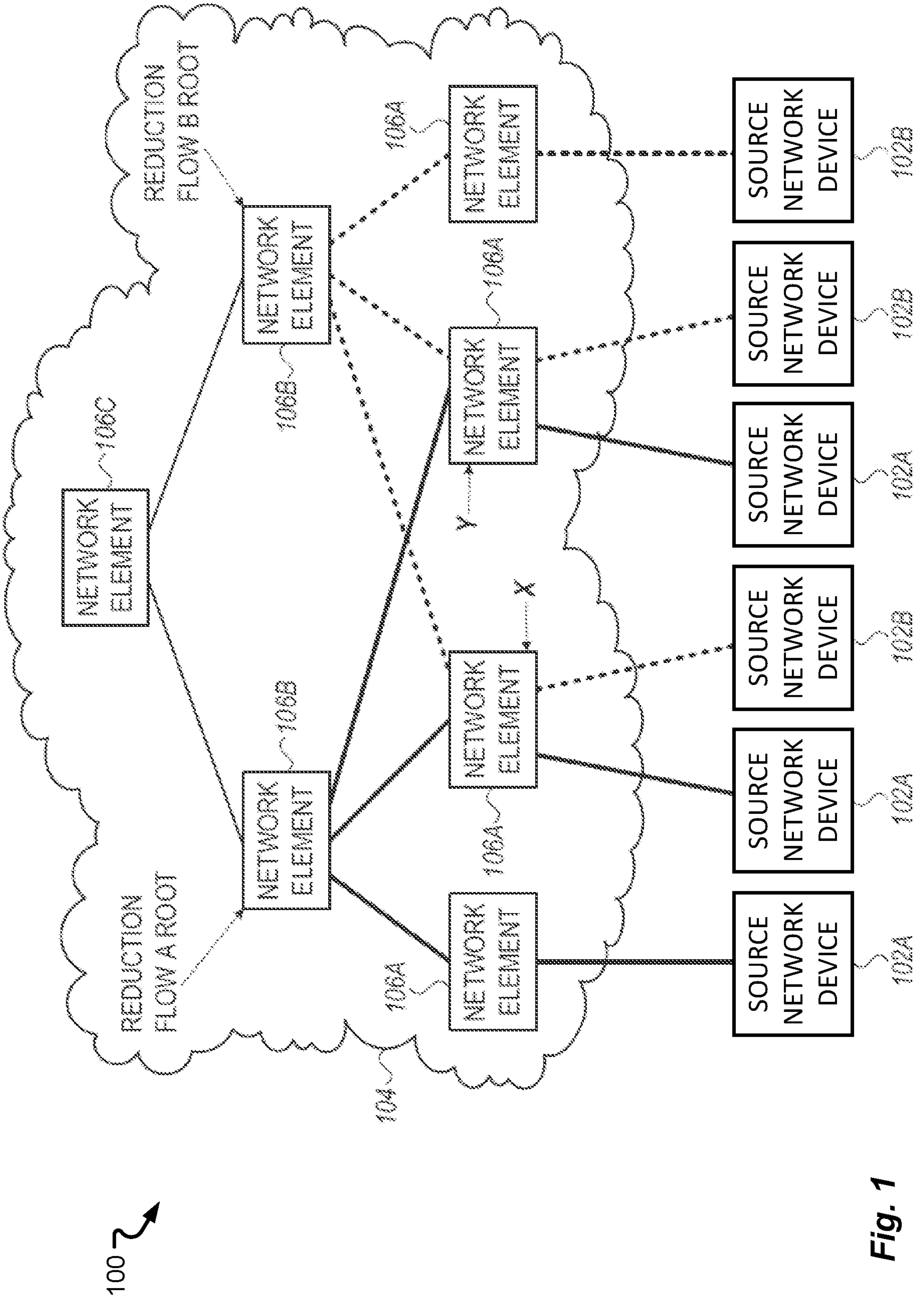
FIG. 1 is a block diagram that schematically illustrates a computing system supporting in-network computing with data reduction, in accordance with some embodiments of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Overview

High performance computing (HPC) systems typically comprise thousands of nodes, each having tens of cores, interconnected by a communication network. The cores may run a plurality of concurrent computation jobs, wherein each computation job is typically executed by a plurality of processors, which exchange shared data and messages.

Message Passing Interface (MPI) is a standardized and portable message-passing standard, developed by a group of researchers from academia and industry, and used in a variety of distributed computing environment, such as HPC (for MPI reference, please see "The MPI Message-Passing Interface Standard: Overview and Status," by Gropp and Ewing; High Performance Computing: Technology, Methods and Applications, 1995; pages 265-269).

MPI defines a set of operations between processes, including operations wherein data from a plurality of processes is aggregated and sent to a single or to a group of the processes. For example, an MPI operation may sum a variable from all processes and send the result to a single process; in another example, an MPI operation may aggregate data from all processes and send the result to all processes. Such operations are referred to hereinbelow as data reduction operations.

In the descriptions hereinbelow, we will refer to the nodes that run the computation jobs as source network devices, and to the switches and/or routers of the communication network as network elements. The network may be arranged in a multi-level tree structure, wherein a network element may connect to child network elements in a lower level and to parent network elements in a higher level. We will refer to all the child network elements of a network element, the child of the child network elements etc., down to and including the source network devices, as the descendants of the network element. We will refer to the minimal subset of the network elements of a physical tree structure that is needed to connect all source network devices of a computing task as the Reduction-Tree, and to the network element at the top level as the root network element. We will further refer to distributed computation tasks that require reduction as reduction flows.

To efficiently execute reduction operations, the network elements may comprise data reduction circuitry which executes some or all the reduction operations, off-loading the source elements and, more importantly, saves multiple transfers of messages over the communication network between the source network device. U.S. Pat. No. 10,284,383, for example, describes a Scalable Hierarchical Aggregation and Reduction Protocol (SHArP™), wherein the network elements comprise data reduction circuitry for the data collection, computation, and result distribution of reduction operations.

To use the data reduction circuitry in the network element, reduction operations may be locked prior to use, to make sure that the resources are not allocated to more than one concurrent reduction flow. According to the SHArP™ protocol, lock requests propagate in reduction trees towards the root network element. Each network element propagates the lock request to the parent network element. The lock request is accompanied with a success or a fail indication, indicating whether or not all the network elements along the path of the request succeeded in allocating resources to the reduction flow. When the request reaches the root network element, the root network element starts a lock-success or a lock-failure propagation through the child network elements and down to the requesting source network devices. The actual reduction operation may commence if all the network elements that participate in the reduction tree succeeded in allocating the requested resources.

Requests from two reduction flows may be dead-locked if both attempt to lock shared network elements at the same time—a first network element may lock a request from the first reduction flow whereas a second network element may lock a request from the second reduction flow; as a result, at a parent network element, both flows may receive a lock-fail response, and will need to retry locking, possibly colliding yet again and, in any case, consuming substantial network resources.

Embodiments according to the present disclosure that are presented herein provide for an improved locking mechanism in distributed computing systems that comprise data reduction circuitry in the network elements. In some embodiments, a source network device that sends a lock request and receives a lock-failure indication may nevertheless send an additional lock request for the same reduction flow. In some embodiments, the source network device appends a "go-to-sleep" indication to the additional lock request. The "go-to-sleep" indication instructs the other source network devices to temporarily refrain from sending additional lock requests. The network elements of the reduction tree, when responding to the lock requests, send the "go-to-sleep" indication back to all source network devices of the reduction flow, and thus, further lock attempts (after the second) may be eliminated or delayed.

In some embodiments, upon receiving a lock-failure response with a "go-to-sleep" indication, source network devices may enter a "sleep" state, and stop issuing lock requests until a preset time period has elapsed, or until explicitly awakened by a "wake-up" message that the source network device may receive from the network.

In embodiments, when a collision occurs on a network element that is shared by two reduction trees (e.g., concurrent lock requests are received for both reduction flows), the network element sends a collision notification message, that propagates up to the root network element and then down to all source network devices; the collision notification message comprises identifications of the prevailing (successful) and the failing reduction flows. Source network devices, upon receiving collision notifications, may update lists of reduction flows that prevail in the collisions ("strong" lists) and lists of reduction flows that fail ("weak" lists). In some embodiments, if a source network device completes the reduction or receives a lock-fail notification, the source network device may send a "wake-up" message up to the root network element, which will then send the massage down to all source network devices which may have entered a "sleep" state. Thus, deadlock of two reduction flows may be avoided. The terms "collision notification message" and "lock collision notification" may be used interchangeably herein.

In some embodiments, to avoid multiple lock retries, source network devices add a "do-not-retry" notification to a lock request. In some embodiments, the source network device is add the "do-not-retry" notification responsive to a preset Retry Criterion, which may comprise, for example, a maximum setting for the number of consecutive failing lock attempts. Thus, if consecutive lock requests fail, the source network device may indicate "do-not-retry" in the next lock request, signaling to all source network devices of the reduction flow not to retry if the current lock attempt fails.

In yet other embodiments, additional techniques for the performance improvement of distributed computing systems are presented.

Thus, according to embodiments of the present disclosure that are provided herein, efficient data reduction in distributed computing systems is achieved by source network devices that retry failed lock attempts in a controlled manner, and by network elements that support such retried lock attempts.

System Description

In the description hereinbelow, the term "network element" will usually refer to network switches; however, embodiments according to the present disclosure are by no way limited to network switches; rather, according to embodiments of the present disclosure, a "network element" refers to any apparatus that sends and/or receives network data, for example a router or a network interface controller (NIC).

FIG. 1 is a block diagram that schematically illustrates a computing system 100 supporting in-network computing with data reduction, in accordance with some embodiments of the present disclosure.

Computing system 100 may be used in various applications such as, High Performance Computing (HPC) clusters, data center applications and Artificial Intelligence (AI), to name a few.

In computing system 100, multiple Source Network Devices 102A and 102B communicate with one another over a communication network 104. Communication network 104 may comprise any suitable type of a communication network operating using any suitable protocols such as, for example, an InfiniBand™ network or an Ethernet network. Source Network Devices 102A and 102B typically comprise a network adapter such as a Network Interface Controller (NIC) or a Host Channel Adapter (HCA) (or any other suitable network adapter), coupled through a high speed bus (e.g., PCIe) to a processor, which may comprise any suitable processing module such as, for example, a server or a multi-core processing module comprising, for example, one or more Graphics Processing Units (GPUs) or other types of accelerators. The terms "source network device" and "source network element" may be used interchangeably herein.

Communication network 104 comprises multiple network elements 106 (including 106A, 106B and 106C) interconnected in a multi-level hierarchical configuration that enables performing complex in-network calculations using data reduction techniques. In the present example, network elements 106 are arranged in a tree configuration having a lower level comprising network elements 106A, a middle level comprising network elements 106B and a top level comprising a network element 106C.

A practical computing system 100 may comprise thousands or even tens of thousands of source network devices 102, interconnected using hundreds or thousands of network elements 106. For example, communication network 104 of computing system 100 may be configured in four-level FatTree topology (see "Fat-trees: universal networks for hardware-efficient supercomputing," by Leiserson, (October 1985), IEEE Transactions on Computers. 34: 892-901), comprising on the order of 3,500 network elements (referred to as switches).

In the multi-level tree structure, a network element may connect to child network elements in a lower level or to source network devices, and to parent network elements in a higher level. The network element at the top level is also referred to as a root network element. A subset (or all) of the network elements of a physical tree structure may form a data reduction tree; computing network 100 may comprise, at any given time, a plurality of data reduction trees, for the concurrent execution of a plurality of data reduction tasks.

While executing data reduction tasks, network elements in lower levels produce partial results that are aggregated by network elements in higher levels of the data reduction tree. A network element serving as the root of the data reduction tree produces the final calculation result (aggregated data), which is typically distributed to one or more source network devices 102. The calculation carried out by a network element 106 for producing a partial result is also referred to as a "data reduction operation."

The data flow from the network nodes toward the root is also referred to as "upstream," and the data reduction tree used in the upstream direction is also referred to as an "upstream data reduction tree." The data flow from the root toward the source network devices is also referred to as "downstream," and the data reduction tree used in the downstream direction is also referred to as a "downstream data reduction tree."

It should be noted that, for each data reduction tree, each network element 106 is coupled to a single upstream network element (except for the root network element, which is the end of the upstream tree); the dual upstream connections of network elements illustrated in FIG. 1 represent overlapping trees of a plurality of data reduction trees.

Breaking a calculation over a data stream to a hierarchical in-network calculation by network elements 106 is typically carried out using a suitable data reduction protocol. An example data reduction protocol is the SHArP described in U.S. Pat. No. 10,284,383 cited above. Network elements 106 support flexible usage of ports and computational resources for performing multiple data reduction operations in parallel. This enables flexible and efficient in-network computations in computing system 100.

Typically, computing system 100 may execute a plurality of data reduction tasks (also referred to as data reduction flows) concurrently. In embodiments, to execute a data reduction task, all network elements 106 that run the data reduction flow must be first be locked, to avoid races with other reduction flows. All source network devices 102 associated with the data reduction flow send lock requests to network elements 106; the network elements then aggregate the lock requests and send corresponding lock requests upstream to the root network element. The root network element sends a lock-success or a lock-fail messages to all the source network devices that sent the lock request messages.

Groups of network elements that are associated with different reduction flows may have some shared elements. According to the example embodiment illustrated in FIG. 1, source network devices 102A are grouped in a Reduction Flow A and source network devices 102B are grouped in a Reduction Flow B. Reduction A tree is marked by solid-thick lines in FIG. 1, whereas reduction B tree is marked by dashed thick lines. The two reduction flows share two network elements 106A, marked X and Y in FIG. 1.

A group of network elements (e.g., source network devices 102A, network elements 106) may be referred to as a "SHARP group" or a group of SHARP end-points. In some aspects, a SHARP group may be a subset of end-points of SHARP trees defined by a SHARP aggregation manager. The SHARP group may be user defined. The SHARP aggregation manager may be implemented by, for example, a source network device 102A or a network element 106 described herein. The term "reduction tree" may refer to a tree spanning a SHARP group over which user specified SHARP operations are performed.

If two reduction flows request to lock the respective network elements at the same time or in close temporal proximity to each other, the requests may collide in the shared network elements. Due to the different delays in the network, lock requests that the source network devices issue may arrive at the respective network elements in a different order. For example, concurrent lock requests issued by Flow-A source network devices 102A and Flow-B source network devices 102B may arrive at the network element marked X at a first order and at the network element marked Y at a different order. The difference in the order of arrival may cause a lock conflict—for example, network element X may get lock requests associated with reduction flow B sooner than lock requests associated with reduction flow A, whereas network element Y may get the reduction flow A request sooner. As a result, both reduction A and reduction B root network elements 106B may send an indication that the lock has failed.

In embodiments, when a source network device 102 receives a fail indication, the source network element may try to lock again and, in case the subsequent lock attempt fails, may cause all other source network adapter for the same flow to suspend lock attempts (will be referred to, figuratively, as "go-to-sleep"). In other embodiments, a source network adapter that initiate lock request following a lock-failure indication may add other indications to the rests (will be detailed below).

In embodiments, in case of a collision, network elements 106 send collision indications to the requesting source network adapters, including an ID of the reduction flow that prevailed and an ID of the reduction flow that failed. In some embodiments, the reduction flow that wins will send, after it finished the reduction, a "wake-up" indication to the source network devices of the failed reduction flow, which will, in turn, "wake-up" and possibly try to lock again (wake-up indications may also be sent when lock request fail, as will be explained further below).

Thus, according to the example embodiment illustrated in FIG. 1, multiple reduction flows may be concurrently executed in partly overlapping reduction trees of a computing network, wherein dead locks which may occur because of collisions between reduction flows are mitigated.

As would be appreciated, system block diagram 100 described above with reference to FIG. 1 is cited by way of example. Computing systems in accordance with the disclosed techniques are not limited to the description hereinabove. In alternative embodiments, for example, some network elements may double functions as source network devices and some source network devices may comprise a plurality of processor, running the same or different reduction flows.

Figure 2:
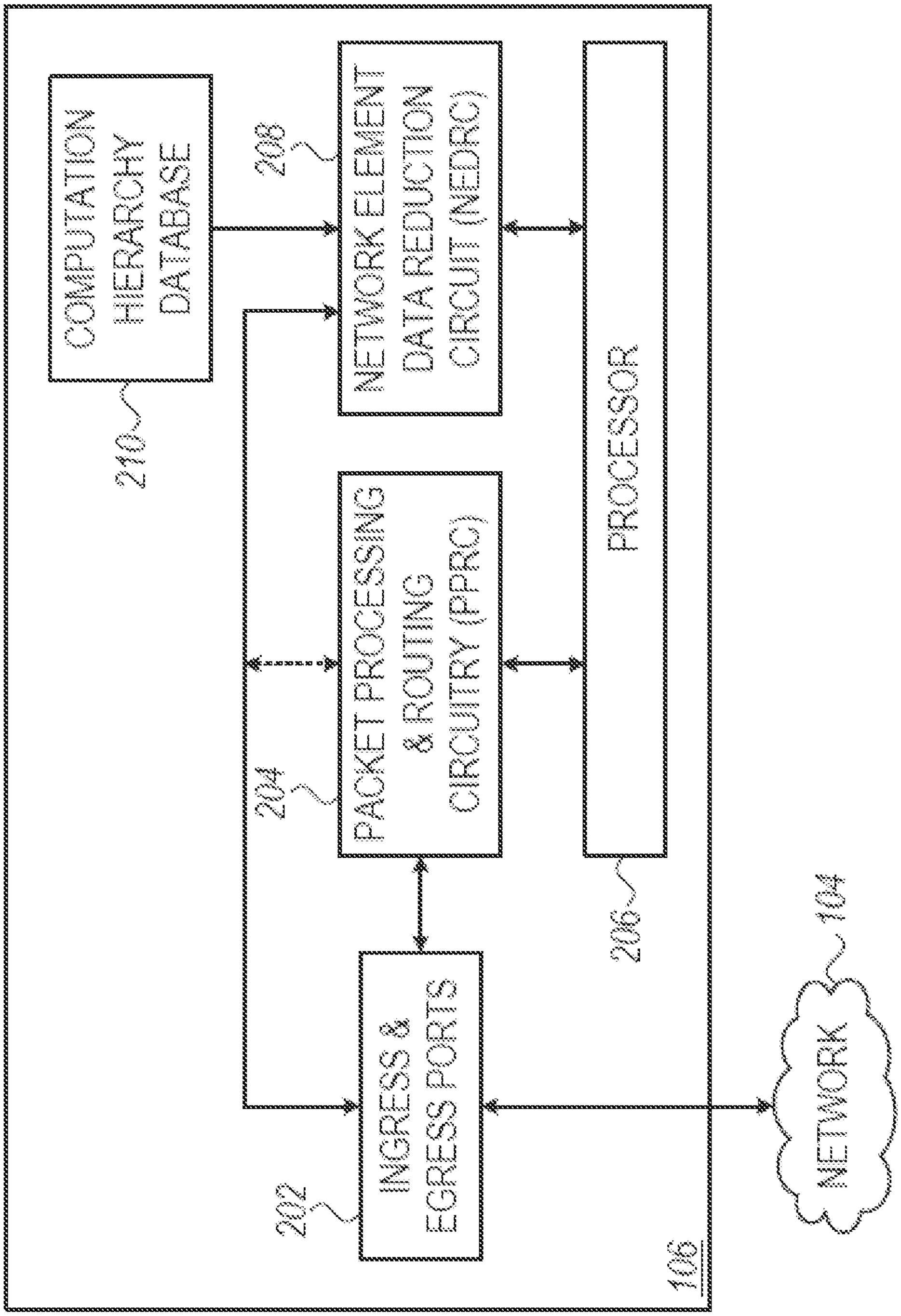
FIG. 2 is a block diagram that schematically illustrates the structure of a network element, in accordance with some embodiments of the present disclosure.

FIG. 2 is a block diagram that schematically illustrates the structure of a network element 106, in accordance with some embodiments of the present disclosure. Network element 106 comprises ingress and egress ports 202, a Packet Processing and Routing Circuitry (PPR) 204 and a Processor 206, which typically comprises one or more processing cores and a hierarchy of memories. Ingress and egress ports 202 (will be referred to as "ports") are operable to communicate packets through switching communication network 104 (FIG. 1) such as Ethernet or InfiniBand™; Packet Processing and Routing Circuitry (PPRC) 204 is configured to receive and parse ingress packets, store the ingress packets in an input queue, build egress packets (including packets copied from the input queue), store egress packets in an output queue and send the egress packets through the ports to the network.

As would be appreciated, PPRC 204, processor 206 and ports 202 collectively comprise a network switching circuit, as is well known in the industry; as such, PPRC 204, processor 206 and ports 202 may comprise further functions such as security management, congestion control and others.

Network Element 106 further comprises a Network Element Data Reduction Circuit (NEDRCC) 208 and a Computation Hierarchy Database 210, which are collectively operable to perform data reduction tasks in accordance with embodiments of the present disclosure. Computation Hierarchy Database 210 comprises memory tables that describe reduction trees for at least one reduction flow, including the corresponding source network devices, the child and the parent network elements. In some embodiments Computation Hierarchy Database 210 may be maintained by processor 206.

NEDRC 208 is configured to execute data reduction functions and to exchange data reduction messages with a parent network element and child network elements (or with source network devices, if the network device is at the bottom of the data reduction tree). The data reduction messages that the NEDRC exchanges comprise lock requests, lock success, lock-fail, collision notification and wake-up.

According to the example embodiment illustrated in FIG. 2, NEDRC 208 sends and receives data reduction packets through ports 202, which are shared by the PPRC and the NEDRC. Alternatively, as indicated by the dashed line in FIG. 2, NEDRC 208 may receive and transmit packets through PPRC 204; for example, NEDRC 208 may receive ingress data reduction packets that are queued and parsed by PPRC 204, and/or send egress data reduction packets to an output queue of PPRC 204.

Lock request messages comprise source identification and other indications. The lock request messages propagate from the source network devices upwards through the reduction tree to the root network element. Network element 106 aggregates lock requests from child network elements or from and sends the aggregated requests upwards, towards the root network element. To prevent deadlocks between concurrent data reduction flows the network element supports propagation and aggregation of "wake-up", "go-to-sleep" and other indications (will be described below with reference to further figures).

When NEDRC 208 is locked to execute data reduction tasks of a first data reduction flow, lock requests from other data reduction flows will result in a collision. NEDRC 208 is configured, in case of a collision, to send collision messages that propagate through the reduction tree up to the root network element and then down to the source network elements. The collision messages include identification (ID) of the colliding reduction flows and is used by the source network element to generate "wake-up" messages, when the data reduction process is completed or when a lock request fails.

Thus, according to the example embodiment illustrated in FIG. 2, network element 106 comprises a of a network switching device and a data reduction circuit; the data reduction circuit is operable to exchange data reduction messages up and down reduction trees, detect and report collisions and, after locking, perform data reduction functions.

In some embodiments, processor 206 is configured to execute some or all the functions that NEDRC 208 executes; hence, in the description herein, the term NEDRC will include portions and software functions of processor 206 that are configured to execute data-reduction circuitry functions.

As would be appreciated, network element 106 described above with reference to FIG. 2 is cited by way of example. Network elements in accordance with the disclosed techniques are not limited to the description hereinabove. In alternative embodiments, for example, NEDRC 208 comprises a dedicated processor or a plurality of processors. In some embodiments, the computation hierarchy database comprises a plurality of look-up tables; in some embodiments, the computation hierarchy database comprises a cache memory for frequently used entries. In some embodiments, parts of NEDRC 208 is distributed in Ports 202.

Figure 3:
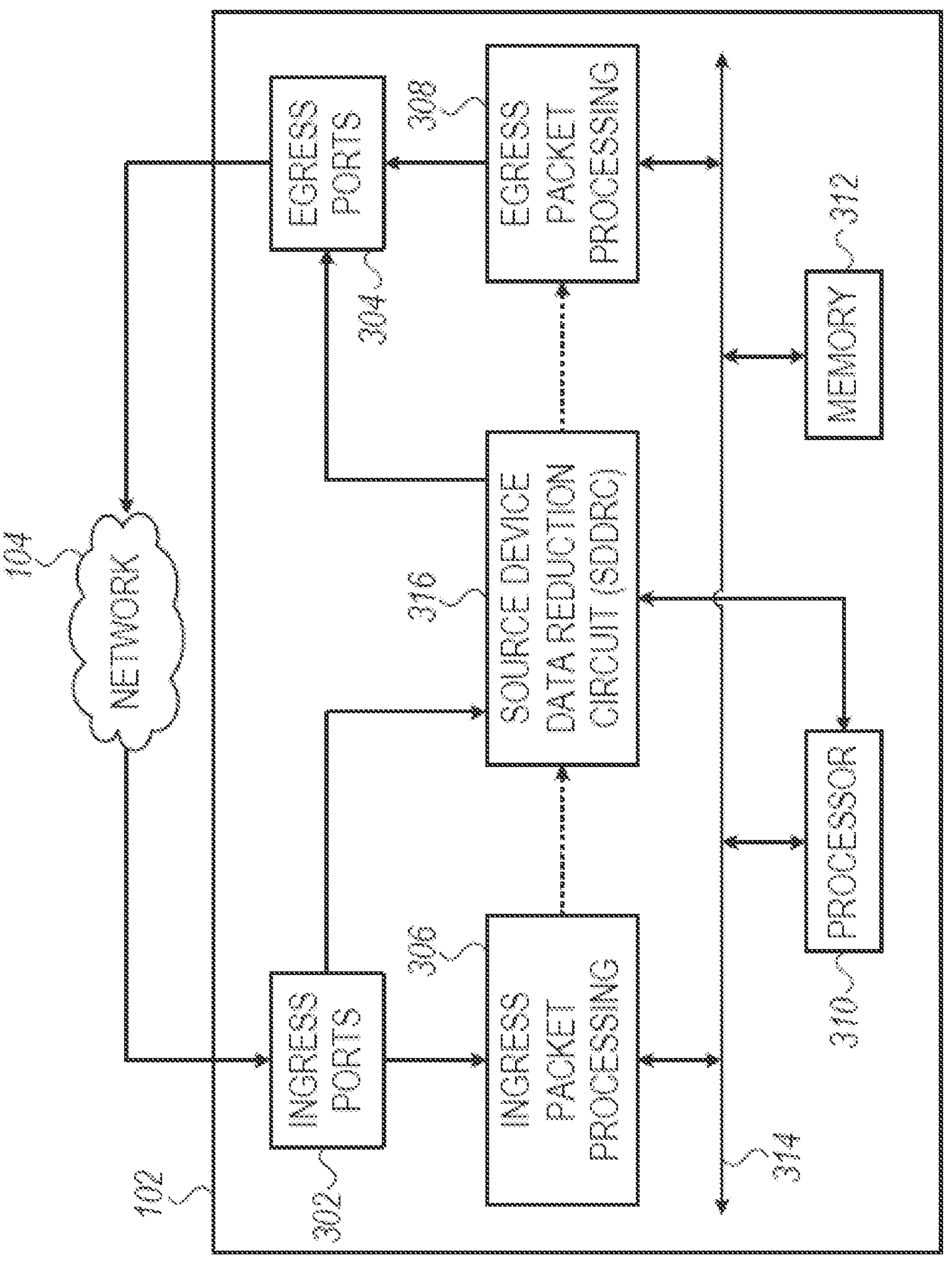
FIG. 3 is a block diagram that schematically illustrates the structure of a source network device, in accordance with some embodiments of the present disclosure.

FIG. 3 is a block diagram that schematically illustrates the structure of a source network device 102, in accordance with some embodiments of the present disclosure. Source network device 102, first introduced with reference to FIG. 1, is configured to exchange packets with network 104, and to run data reduction computation jointly with other source network elements and with network elements 106 of network 104.

Source Network Device 102 comprises Ingress Ports 302, configured to receive packets from the network; egress ports 304, configured to send packets to the network; an Ingress Packet Processing unit 306, configured to queue and process ingress packets; and, an Egress Packet Processing unit 308, configured to process and queue egress packets.

Source Network Device 102 further comprises a processor 302, which is configured to source and sink packets and to control the operation of the source network device; a memory 312, which may store code and data; and, a high speed bus (e.g., Peripheral Component Interface express (PCIe)), which is operable to transfer high speed data between Ingress Packer Processing unit 306, Egress Packer Processing unit 308, Processor 310 and Memory 312.

In embodiments, processor 310 may comprise one or more CPUs, such as ARM or RISC-V. In some embodiments, Processor 310 comprises a local fast memory, such as a cache memory.

As would be appreciated, ingress Ports 302, egress ports 304, ingress packet processing unit 306, egress packet processing unit 308, processor 302 and memory 312 collectively comprise a Network Adapter, such as a Network Interface Controller (NIC) in Ethernet terminology, or a Host Channel Adapter (HCA) in InfiniBand™ terminology. Such network adapters are well known in the industry, and sometimes include additional functions such as security, diagnostics, and others. Source network devices 102 according to the present disclosure may comprise such additional network adapter functions.

Processor 310 may run data reduction computations in collaboration with other source network devices that are coupled to network 104. Such reductions may require reliable locking and releasing of network elements. To that end, source network device 102 further comprises a Source Device Data Reduction Circuit (SDDRC) 316. The SDDRC receives lock requests and lock-release requests from processor 310 and indicates to the processor when a lock is achieved. SDDRC 316 further receives data reduction packets from Ingress Ports 302 and sends data reduction packets through egress ports 304. In an alternative embodiment, as indicated by the dashed arrows, the SDDRC may receive data reduction packets from Ingress Packet Processing 306; e.g., after queueing and/or parsing; in another alternative embodiment, the SDDRC sends data reduction packets through Egress Packet Processing 308; e.g., the SDDRC may send the packets to an output queue of Egress Packet Processing 308.

The SDDRC communicates data reduction packets with a parent network adapter 106. An SDDRC may have a plurality of parent network adapter, but with respect to each data reduction flow, the SDDRC communicates data reduction packets with a single parent network adapter In some embodiments, processor 310 may comprise some or all the functions of SDDRC 316; hence, the term "SDDRC" (or data-reduction circuitry), as used hereinbelow may refer to the aggregation or processor 310 and SDDRC 316.

To start a data reduction session, the SDDRC sends a lock request packet, and receives a lock success or a lock failure response packet. The SDDRC is configured, upon receiving a lock-failure packet, to send another lock request with a "go-to-sleep" indication, unless the incoming lock-failure already comprises a "go-to-sleep" indication that was sent by other source network devices of the same reduction flow, in which case the SDDRC will suspend locking attempts ("go-to-sleep"). In some embodiments, the lock failure packet may comprise additional indications, as will be detailed below, with reference to further figures.

The SDDRC is further configured to receive collision notification packets when a lock request that source network device 102 (or another source network device of the same reduction flow) has sent collides with a lock request from another reduction flow over the same network adapter. Such collision indication packets may comprise ID indication for the two colliding requests; in some embodiments, SDDRC 316 maintain a Strong list and a Weak list, and updates the lists upon receiving a collision indication packet, add an ID of the winning reduction flow to the Strong list, and an ID of the losing reduction flow of the Weak list.

In some embodiments, upon completing a reduction session, the SDDRC may send "wake-up" messages to source network devices of reduction flows indicated in the Weak list. In another embodiment, when the SDDRC has "gone-to-sleep" and then receives a "wake-up" packet, the SDDRC will resume locking attempts. In yet other embodiments, when the SDDRC "goes-to-sleep" the SDDRC also activated a timer, to limit the time that the SDDRC is idle in case no "wake-up" packet is received.

In summary, a source network adapter according to the example embodiment illustrated in FIG. 3 is a network adapter with dedicated source device data reduction circuitry (SDDRC). The communicates with reduction trees in the network, sending lock requests and receiving lock responses with "go-to-sleep" and other flags. The SDDRC also receives collision indications and updates strong and weak lists responsively. Upon reduction termination or upon failing lock attempts, the SDDRC may send "wake-up" packets to reduction flows that have "gone-to-sleep", and, when "sleeping" the SDDRC "wakes-up" when receiving a suitable "wake-up" packet, or when a timer expires.

As would be appreciated, Source Network Device 102 described above with reference to FIG. 3 is cited by way of example. Source network devices in accordance with the disclosed techniques are not limited to the description hereinabove. In alternative embodiments, for example, parts or all SDDRC 316 functions are executed by processor 310. In other embodiments, SDDRC 316 comprises a dedicated processor or a plurality of processors. In some embodiments, bidirectional ingress-egress ports may be used, instead of or in addition to the unidirectional Ingress-Ports 302 and Egress ports 304.

Source Network Device Flowcharts

Figure 4A:
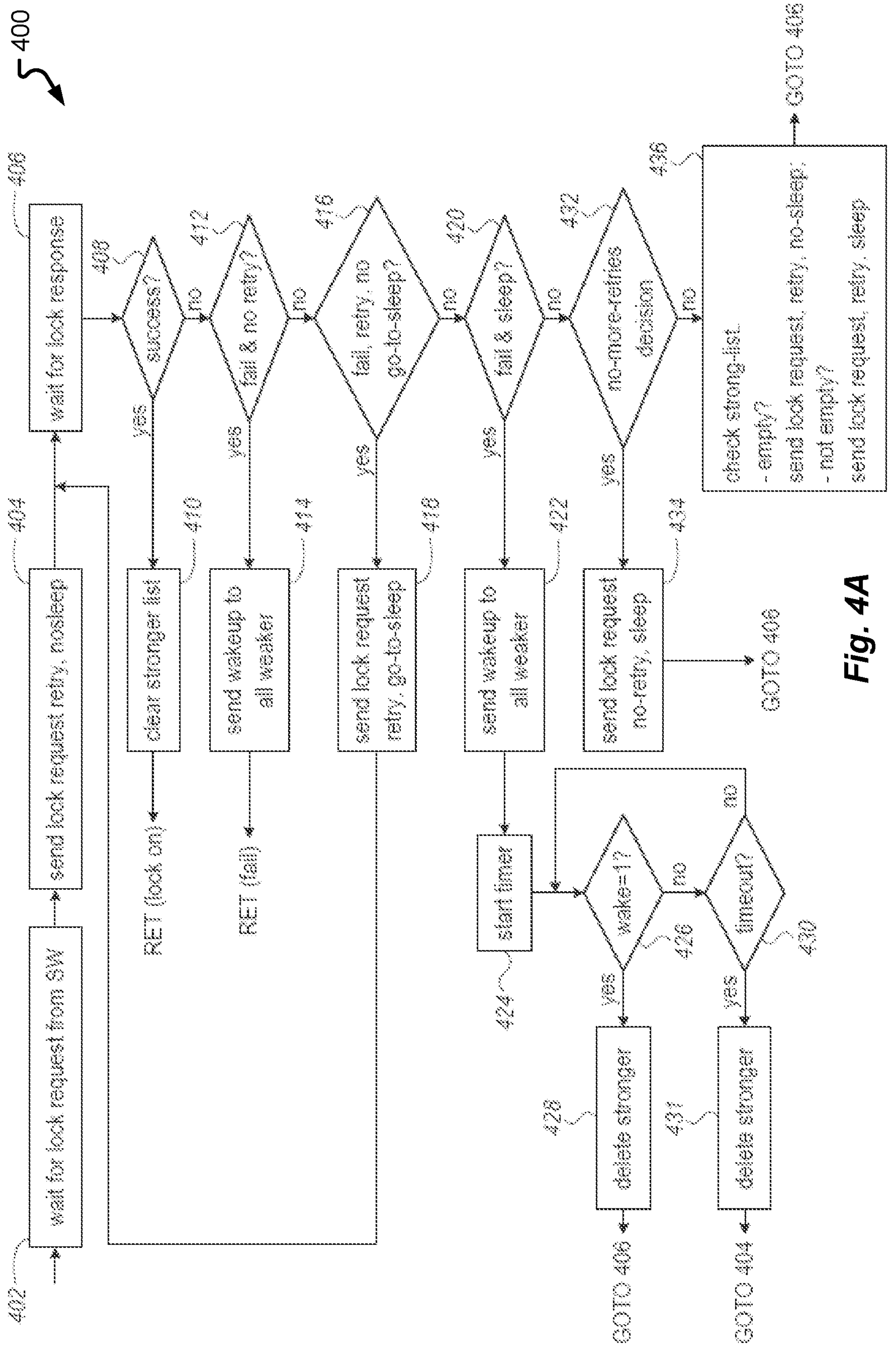
FIG. 4A is a flowchart that schematically illustrates a method for efficient resource lock by a source network device, in accordance with some embodiments of the present disclosure.

We will now proceed to describe methods for efficient reduction lock in a source network device, with reference to FIGS. 4A, 4B and 4C, which describe concurrent flowcharts of the source network device. In the descriptions hereinbelow, we will refer to SDDRC 316 (FIG. 3) as the entity which executes the flowcharts; however, in alternative embodiments, processor 310 may execute at least some of the source network devices described herein.

RET (Return) in a flowchart indicates return of control to the processor; the SDDRC may send a parameter with the Return, such as Failure or Lock-On.

The descriptions hereinbelow refer only to lock related messages and states. As would be appreciated, source network devices according to the present disclosure typically execute numerous additional functions, including but not limited to data reduction computations.

FIG. 4A is a flowchart 400 that schematically illustrates a method for efficient resource lock by a source network device, in accordance with some embodiments of the present disclosure.

According to the example embodiments illustrated in FIG. 4A, lock request messages comprise, in addition to the "go-to-sleep" indication described hereinabove, a "do-not-retry" indication. In some embodiments, the source network device adds a "do-not-retry" indication to the lock request responsive to a preset Retry Criterion, e.g., a maximum setting for the number of consecutive failed lock requests. We assume, in the description hereinbelow, that both the "go-to-sleep" and the "do-not-retry" indications are flags embedded in the lock request messages, and each flag can be either set (on) or cleared (off); other methods to indicate "do-not-retry" and/or "go-to-sleep", including sending additional messages, may be used in alternative embodiments.

SDDRC 316 maintains a Strong List and a Weak List. Both lists are initially empty. When lock requests from two reduction flows collide in any upstream network element, the SDDRC receives a collision indication through the parent network element; the SDDRC then adds to the upstream message the ID of the reduction flow that prevailed the collision to the Strong List, and the ID of the flow that failed to the Weak List.

The flow starts at a Wait-SW-Lock-Request step 402, wherein the SDRC is idle, waiting for the next lock request from the processor 310. When the SDDRC receives a lock request from the processor, the SDDRC enters a first Send-Lock-Request step 404. In step 404 the SDDRC sends a lock request packet to the parent network element, with cleared "do-not-retry" and "go-to-sleep" flags.

After step 404 the SDDRC enters a Wait-Lock-Response step 406 and waits to receive a lock response from the parent network element. When the SDDRC receives the lock response, the SDDRC enters a check-success step 408, and, if the lock response is "success", the SDDRC enters a Clear-Strong-List step 410, clears all entries from the Strong-List, signals to processor 310 that the lock is successful, and terminates the flow.

If the lock response that the SDDRC receives in step 408 is not a Success, the SDDRC enters a Check-Fail-No-Retry step 412, and check whether the "do-not-retry" flag is set.

A set "do-not-retry" flag may mean that at least one of the source network devices associated with the present reduction flow is indicating that it will cease further attempts to relock if the present attempt fails, and asks all other source network devices to do the same. In this case the SDDRC will stop lock attempts; however, before doing so, the SDDRC enables other source network devices that may be waiting for the lock to be cleared that they should reattempt to lock. To that end, the SDDRC enters a Sending Wake-Up step 414 and sends a Wake-up message to all source network elements of all the reduction flows listed in the Weak-List. In some embodiments, only a single "master" source network device from the source network devices of the present reduction flow sends the wake-up message. After step 414, the SDDRC signals to processor 310 that the lock has failed and terminates the flow.

If, in step 412, the result that the SDDRC receives is not a fail with a set "do-not-retry" flag, the SDDRC enters a Check-Fail-Retry-Do-Not-Go-To-Sleep step 416 and checks if the "do-not-retry" flag and the "go-to-sleep" flags in the received lock-fail message are clear. According to the example embodiment illustrated in FIG. 4A, both flags will be cleared in a first lock failure, and, as the failure may be transient, the source network devices will retry to lock, this time indicating that further failures should cause the corresponding source network devices to suspend lock attempts for a while ("go-to sleep"). The SDDRC, therefore, upon receipt of a lock failure indication with cleared "do-not-retry" and "go-to-sleep" flags, will enter a Send-Lock-Request-with-Set-Go-To-Sleep step 418 and send a lock request with the "go-to-sleep" flag set and the "do-not-retry" flag cleared, and then will reenter step 406 to wait for a lock response.

If, at step 416, the response is Fail and either the "go-to-sleep" or the "do-not-retry" flags are set, the SDDRC will enter a Check-Fail-Go-To-Sleep step 420, and check if the response is Fail with a set "go-to-sleep" flag. A set "go-to-sleep" flag means that a source network device of the present reduction flow has reattempted a lock request following a lock-fail indication, and requested that all source network devices of the present reduction flow retry to lock, after some delay. The SDDRC enters, if a fail with set "go-to-sleep" flag is received in step 420, a Send-Wake-up step 422, wherein the SDDRC sends a wakeup message to all source network elements of all the reduction flows indicated in the Weak-List, enters a Start-Timer step 424 and starts a count-down timer, and then enters a Check-Wake-Up step 426. If the SDDRC receives a "wake-up" packet in step 426 the SDDRC will enter a first Delete-Stronger step 428 and delete all entries from the Strong List, and then reenter Send-Lock-Request step 404. If, at step 426, the SDDRC does not receive a "wake-up" packet, the SDDRC will enter a Check-Timeout step 430, and check if the timer (that was started in step 424) has expired. If so, the SDDRC will, at a second Delete-Stronger step 431, delete all entries from the Strong List, and then reenter Wait-SW-Lock-Request step 402; else, the SDRCC will reenter step 426.

If, in step 420, the response is not fail-with-a-set go-to-sleep-flag-on, the SDDRC enters a Checking-No-More-Retries step 432. In some embodiments, the source network device decides that no more lock requests should be attempted after a predefined number of consecutive failed lock requests. In other embodiments, other criteria may be employed to decide if more lock attempts should be exercised, for example, responsive to an importance measure of the present reduction flow.

When no more lock requests should be exercised, the source network device sends a last lock request, with the "do-not-retry" flag set. This ensures that all source network devices of the same flow will stop lock requests synchronously.

In step 432, if no more lock attempts should be exercised, the SDDRC enters a Send-Lock-Request-No-Retry step 434 and sends a lock request indicating that no more retries should be attempted. The SDDRC then reenters step 406, to wait for the lock request response. If, in step 432, the "do-not-retry" flag is not set, the SDDRC enters a Check-Strong-List step 436.

In step 436 the SDDRC sends a lock request, with a clear "do-not-retry" flag; if the strong list is empty, the go-to-sleep flag will be cleared, if the strong-list is not empty, the go-to-sleep flag will be set. After step 436, the SDDRC reenters step 406, to wait for a response.

Thus, according to the example embodiment illustrated in FIG. 4A, a source network device may send lock request messages to a parent network element responsive to a lock request from a reduction software; responsive to failure massages with "go-to-sleep" and "do-not-retry" indications-either resend lock requests or enter a "sleep" state; maintain a strong and a weak list, send wake-up messages to weaker reduction flows upon lock failures. Aspects of the flowchart 400 associated with implementing a lock request may increase lock efficiency in distributed computing systems.

FIG. 4B is a flowchart 450 that schematically illustrates a method for responding to packet from a parent network element by a source network device, in accordance with some embodiments of the present disclosure.

According to the example embodiment illustrated in FIG. 4B, the parent network element may send to the source network device three types of packets-response to lock request, "wake-up" and collision notification (in alternative embodiments, the network element may send additional types of packets).

The flow starts at a Wait-For-Packet step 452, wherein the SDDRC waits for the next packet that the parent network element sends. When a packet arrives, the SDDRC enters a Check-Lock-Request-Response step 454 and checks if the received packet is a response to a lock request (such as steps 404, 418, 434 or 436, FIG. 4A). If so, the packet is handled by the main loop 400 (FIG. 4A) and the SDDRC reenters step 452 to wait for the next packet (if, for any reason such as malfunction, the SDDRC is not in the main loop, the SDDRC ignores the lock response packet).

If, in step 454, the received packet is not a response to a lock request, the SDDRC enters a Check-Wakeup step 458, and checks is the received packet is a "wake-up" packet. "Wake-up" packets are handled by the source network device main loop 400 (or, if the software is no longer attempting to lock, "wake-up" packets may be ignored); hence, if, in step 458, the received packet is a "wake-up" packet, the SDDRC reenters step 452 and waits for the next packet.

If, in step 458, the received packet is not a "wake-up" packet, the packet is a collision indication packet (the last remaining packet type covered by loop 450). The SDDRC will then enter a Check-Stronger step 463, and check if the collision packet indicates that the reduction flow of the source network device has prevailed in the collision. If so, the SDDRC enters an Add-to-Weak-List step 464, adds an ID of the failing reduction flow to the Weak-List (indicating to the source network device which reduction flows should receive a "wake-up" packet when the reduction ends) and then reenters step 452.

If, in step 462 the collision packet indicates that the source network device has not prevailed in the collision (e.g., the current reduction flow is weaker than the colliding reduction flow), the SDDRC enters a Check-Lock-Request-Pending step 466. If the software is no longer waiting for a lock (e.g., the locking attempt was interrupted by a higher priority task, or a lock is already on), the SDDRC will, in an Add-Strong step 468, adds an ID of the prevailing reduction flow to the Strong-List, and then reenter step 452. The terms "collision packet" and "lock collision packet" may be used interchangeably herein.

FIG. 4C is a flowchart 480 that schematically illustrates a method for exit from reduction by a source network device, in accordance with some embodiments of the present disclosure. The flow starts when the software exits a reduction session at a Send-Release step 482. The SDDRC sends a Lock-Release packet to the parent network element (which, in turn, will release the lock and propagate the release packet up, towards the root network element). The SDDRC then enters a Send-Wakeup step 484, send a "wake-up" message to source network devices of all the reduction flows that are indicated in the Weak-List, and terminate.

As would be appreciated, the methods illustrated in flowcharts 400, 450 and 480 that are described above with reference to FIGS. 4A, 4B and 4C are cited by way of example. Methods and flowcharts in accordance with the disclosed techniques are not limited to the description hereinabove. In alternative embodiments, for example, some or all the steps of flowchart 400, 450 and 480 may be executed in a different order, and in other embodiments some or all the steps of flowchart 400, 450 and 480 may be executed concurrently. In some embodiments, when the SDDRC receives a fail-retry-do-not-"go-to-sleep" response in step 412, the SDDRC may wait a preset time before entering step 414. In embodiments, when the SDDRC waits before sending a next lock request, the wait period will be random, to lower the odds that retry attempts from other reduction flow will arrive at the same time.

Network Element Flowcharts

Figure 5A:
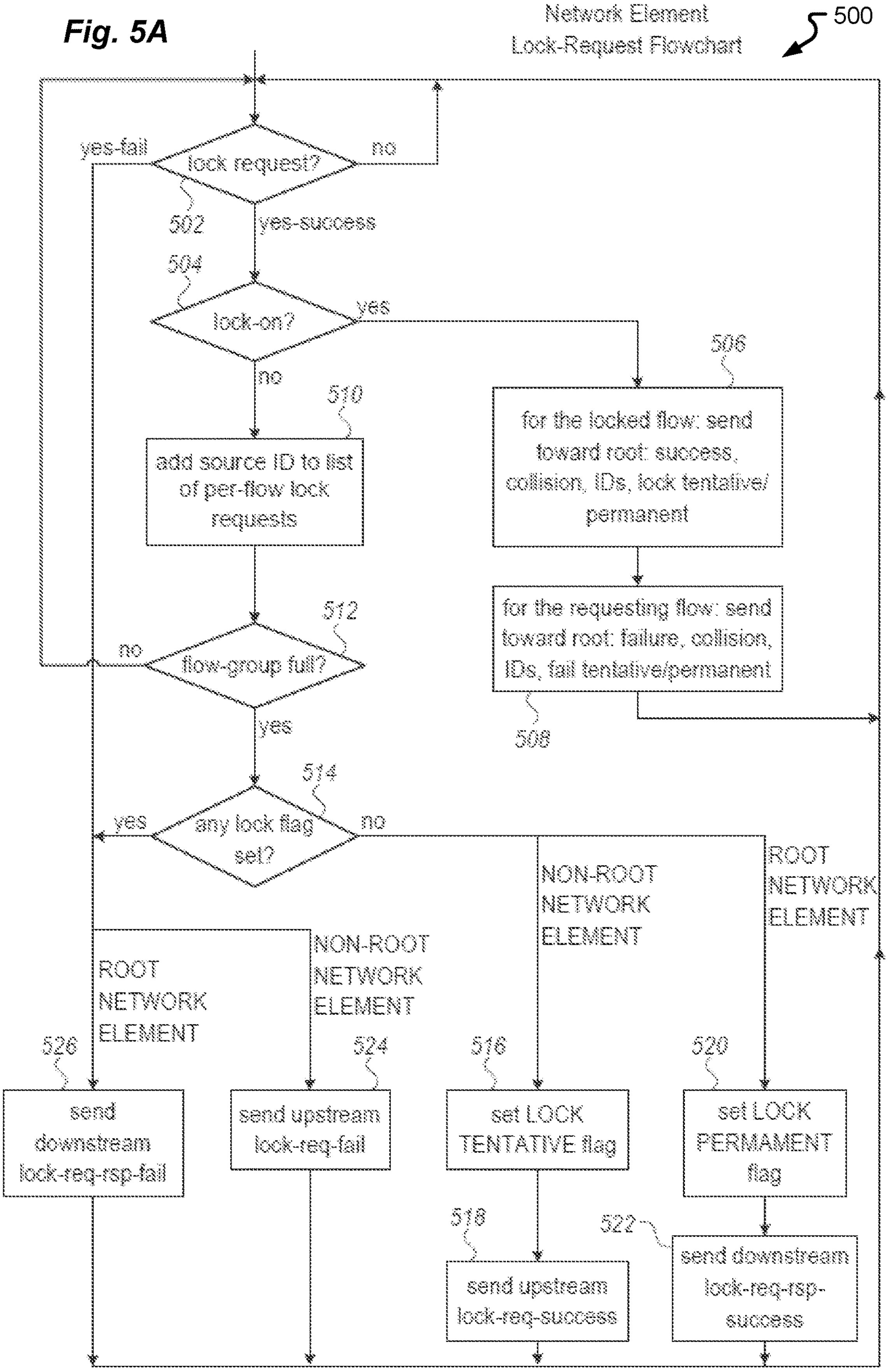
FIG. 5A is a flowchart that schematically illustrates a method for lock request message handling by a network element, in accordance with some embodiments of the present disclosure.

We will now proceed to describe methods for efficient reduction lock in a network element, with reference to FIGS. 5A, 5B and 5C, which describe concurrent flowcharts of the network element. In the descriptions hereinbelow, we will refer to NEDRC 208 (FIG. 1) as the entity which executes the flowcharts; however, in alternative embodiments, processor 210 may execute at least some of the source network devices described herein.

The descriptions hereinbelow refer only to lock related messages and states. As would be appreciated, network elements according to the present disclosure typically execute numerous additional functions, including (but not limited to) packet routing and the execution of the data reduction functions.

FIG. 5A is a flowchart 500 that schematically illustrates a method for lock request message handling by a network element 106 (FIG. 2), in accordance with some embodiments of the present disclosure. According to the example embodiment illustrated in FIG. 5A, the NEDRC maintains a Lock-Request list, comprising lock-request entries. Each lock-request entry comprises a reduction flow-ID field, which identifies the reduction flow of the requesting source and a source-ID field, which identifies the requesting source (e.g., a source network device or a child network element).

The lock-request list further comprises, for each reduction flow, an aggregated "go-to-sleep" flag and an aggregated "do not retry" flag. When the NEDRC enters a new entry to the list, the NEDRC aggregates the "go-to-sleep" and the "do-not-retry" flags of the new entry with corresponding stored flags by implementing an OR assignment function:

Aggregated-flag=Aggregated-flag OR New-flag.

Flow 500 starts at a Check-Lock-Request step 502, wherein the NEDRC waits to get a lock request from a downstream network element (or from a source network device, if the network element is directly coupled to a source network device). The NEDRC loops through step 502 until the NEDRC receives an upstream lock request with success indication (or a lock request directly from a source network element), and then enters a Check-Lock-On step 504, to check if a Lock flag of the network element (permanent or tentative) is set (the case wherein a the NEDRC receives a failed lock request from a child network element will be described further below).

If, in step 504, the network element is already locked, the NEDRC will enter a Send-Locked-Flow-Collision step 506 and send a collision packet upstream, towards the root network element. The collision indication packet comprises a collision indication, a success indication, the IDs of the locked and requesting reduction flows, and an indication whether the lock is tentative or permanent (as mentioned, the lock is tentative until the NEDRC receives a downstream lock-success packet, and then turns to permanent).

Next, the NEDRC will enter a Send-Requesting-Flow-Collision step 508 and send a collision packet upstream, towards the root network element. The collision indication packet comprises, like in step 506, a collision indication, a failure indication, the IDs of the locked and requesting reduction flows, and an indication if the failure is tentative or permanent. After step 508 the NEDRC reenters step 502 and waits for the next upstream message.

If, at step 504, the network element is not locked, the NEDRC will enter an Add-to-Request-List step 510 and add the current request to a list of requesting sources (as explained above, this steps aggregates the "go-to-sleep" and the "do-not-retry" flags with corresponding aggregated flags in the list). The NEDRC will then enter a Check-Flow-Full step and check if all lock requests for the current reduction flow ID have been received. For that purpose, the NEDRC may compare the lock request list with computation hierarchy database 210 (FIG. 2), which holds the list of all sources for each reduction flow. If not all sources of the data reduction flow have been received, the network element should not lock, and the NEDRC reenters step 502, to wait for the next upstream lock request.

If, in step 512, all members of the reduction flow group have requested lock, the NEDRC will, at a check-lock-set step 514, check if the network element is already locked (by a different data reduction flow). If the network element is not locked, and if the network element is not the root of the reduction tree, the NEDRC will enter a Set-Lock-Tentative step 516, set the Lock-Tentative flag, and then, in a Send-Lock-Request-Success step 518, propagate the lock request upstream, with a success indication. If, in step 514, the network element is not locked, and if the network element is the root of the reduction tree, the NEDRC will enter a Set-Lock-Permanent step 520, set the Lock-Permanent flag and then, in a Send-Lock-Request-Response-Success step 522, send a Success response to the lock request downstream, toward all the requesting source network devices.

If, in step 514, the network element is already locked, and if the network element is not the root of the reduction tree, the NEDRC will enter a Send-Lock-Request-Fail step 524, wherein the NEDRC propagates the lock request upstream, with a failure indication. If, in step 514, the network element is locked, and if the network element is the root of the reduction tree, the NEDRC will enter a Send-Lock-Request-Response-Failure step 526, and send a Failure response to the lock request downstream, toward all the requesting source network devices.

If, at step 502, the NEDRC receives a lock request with fail indication from a child network element, the NEDRC will enter step 526 if the network element is the root of the reduction tree, or step 524 of the network element is not the root of the reduction tree.

FIG. 5B is a flowchart 540 that schematically illustrates a method for lock-request response handling by a network element 106 (FIG. 2), in accordance with some embodiments of the present disclosure. The flow starts at a Wait-Lock-Request-Response step 542, wherein the NEDRC waits for a downstream lock-request response packet.

As described above, downstream lock response packets may be initiated in steps 522 or 526 (FIG. 5A) of lock-request flowchart 500, and then propagated downstream to child network elements.

When the NEDRC receives a lock-request response packet, the NEDRC enters a Check-Success step 544. If the lock-request-response type in step 544 is "failure", the failure of the lock request is now final; the NEDRC will enter a Set-Fail-Permanent step 546, set the Fail-Permanent flag and clear the Fail-Tentative flag. If, in step 544, the lock-request-response type is "success", the success of the lock request is now final; the NEDRC will enter a Set-Lock-Permanent step 548, set the Lock-Permanent flag and clear the Lock-Tentative flag. After both steps 546 and 548 the NEDRC propagates the lock-request-response packet downstream, to a child network element (or, if the child node is a source network device, to the source network device).

FIG. 5C is a flowchart 560 that schematically illustrates a method for Reliable Multicast (RMC) propagation by a network element 106 (FIG. 2), in accordance with some embodiments of the present disclosure. RMC packets are initiated at a child, propagate upstream to the root network element, and then propagate downstream from the root network element to the source network devices.

RMC packets in the context of the present disclosure, are "wake-up" packets that are initiated by source network devices, and collision notification packets that are initiated by the network elements in which the collision occurs. In embodiments, other RMC types may be used, for data reduction and for non-data reduction purposes. To some extent, the lock-request and response described hereinabove are RMCs, with the lock request propagating upstream and the lock-request-response propagating downstream (however, as lock-request and lock-request response are also affected and affect the network elements in the upstream and downstream paths, they are described separately hereinabove).

Flow 560 starts at a Wait-RMC step 562, wherein the NEDRC waits to receive an upstream or a downstream RMC packet. When the NEDRC receives a downstream or an upstream RMC packet, the NEDRC, in a Check-RMC-Type step 564, selects the next step. For a downstream RMC the NEDRC will enter a Send-Downstream step 566 and propagate the received RMC downstream, whereas for a upstream RMC, if the network element is not the root of the reduction tree, the NEDRC will enter a Send-Upstream step 568 and propagate the received RMC upstream. If the network element is the root of the reduction tree, the NEDRC sends the received RMC packet (which is, by definition, an upstream packet) downstream, to the child network element; hence, in step 564, if the RMC that the network element receives is an upstream RMC and the network element is the root, the NEDRC will enter step 566 and send the received RMC downstream.

After both steps 566 and 568 the NEDRC reenters step 562, to wait for the next RMC packet.

Thus, according to the example embodiment illustrated in FIGS. 5A, 5B and 5C a network element may propagate a successful or a failed lock request upstream, waiting for requests from all descendent source network devices of a reduction flow; maintain tentative and permanent lock flags; and send collision notifications to prevailing and failing reduction flows that request lock. Root network element may send upstream messages downstream towards the source network elements. The network elements are also configured to support RMC, by propagating RMC messages upstream to the root and downstream to the source network devices, wherein the root network element receives the upstream message and sends the message downstream.

As would be appreciated, the methods illustrated in flowcharts 500, 540 and 560, which are described above with reference to FIGS. 5A, 5B and 5C are cited by way of example. Methods and flowcharts in accordance with the disclosed techniques are not limited to the description hereinabove. In alternative embodiments, for example, some or all the steps of flowcharts 500, 540, 560 may be executed concurrently, and in other embodiments the steps may be executed in a different order. In some embodiments, the flowcharts may comprise additional steps, e.g., authenticating the child networks elements and the source network devices.

The configuration of source network device 102 including SDDRC 316, network element 106 including NEDRC 208, the methods of flowcharts 400, 450, 480, 500, 540 and 560 are example configurations and flowcharts that are shown purely for the sake of conceptual clarity. Any other suitable configurations and flowcharts can be used in alternative embodiments.

In some embodiments, for example, network elements may double-function as source network devices. In some embodiments, a single source network device may comprise a plurality of processors which may run the same or different reduction flows. In some embodiments, source network devices are configured, when sending a "go-to-sleep" message, to add a sleep duration indication, and, when receiving a "go-to-sleep" with a sleep time-duration indications, to "go-to-sleep" for the specified time-duration.

Example embodiments of the present disclosure supportive of locking a tree (e.g., a reduction tree, for example, Reduction A tree or Reduction B tree described with reference to FIG. 1) are described herein.

In an example flow for locking a reduction tree (e.g., Reduction A tree), a lock request for a given SHARP group (e.g., group of network elements 106) may be initiated automatically or by a "user" request (e.g., provided by a source network device 102). In some cases, the lock request is sent up the reduction tree (e.g., upstream from a leaf node, for example, a network element 106A) when the lock request first arrives, independent of the state of the tree. Accordingly, for example, the computing system 100 may support recognition of the lock request by other relevant lock requests (e.g., lock requests associated with the same set of resources), independent of the outcome of the lock request sent upstream. For example, for a lock request sent upstream, other lock requests for the same set of resources may recognize the lock request. In an example, sending the lock request upstream will cause the lock request to be recognized by the other relevant requests, independent of the outcome of the lock request.

Each leaf node of the tree may track lock requests sent by other leaf nodes of the tree. For example, the system 100 may support tracking the lock requests at the leaf nodes of the tree. In some aspects, each leaf node is capable of initiating a lock request. Each leaf node, for example, may be an HCA configured for managing lock requests and tracking states associated with the lock requests. In some aspects, a "lock request" is a distributed object, with every member of a sharp group initiating the lock request. Accordingly, for example, with multiple lock requests, each lock request will generate a corresponding group of lock initialization requests.

Each lock request is sent upstream, towards the root node (e.g., network element 106C) of the tree. The state of a lock request is resolved at each SHARP tree node (e.g., network element 106A, network element 106B) on the way to the root node. Locking a resource is attempted once all children have arrived. For example, a node (e.g., network element 106) may attempt to lock a resource of the communication network 104 once lock requests from all child nodes of the node have arrived at the node. If a resource associated with a lock request is available, a tentative lock is obtained. Accordingly, for example, the tree will be locked if a tentative lock is obtained for all SHARP tree nodes (e.g., network elements 106A, network elements 106B) on the way to the root node (e.g., network element 106C), and the root node can be locked.

In some examples, the resource may be unavailable (e.g., already locked in association with another lock request). In some cases, the lock attempt may fail if a priority associated with the lock attempt is lower in comparison to a priority associated with another lock attempt. Examples of additional criteria associated with a lock attempt failure are described herein.

According to example aspects of the present disclosure, a given node may either be locked, tentatively locked, or free. That is, for example, resources of the node may be locked, tentatively locked, or free. A lock request that is made first to a free node will gain the lock. Previously failed lock requests may each have a respective priority based on when each of the lock requests was made. Aspects of the present disclosure include using the respective priorities in initiating subsequent lock requests for previously failed lock requests. For example, the lock requests may be ordered locally, and the lock requests may be issued one at a time, thus avoiding collisions with other already recorded lock requests. In some cases, all leaf nodes use the same priority values for a given lock request, so all leaf nodes will generate the same order.

If a lock request fails (e.g., in a network element 106A), the failed lock request proceeds up the tree to the root node (e.g., network element 106C). For example, all subsequent lock requests (e.g., in a network element 106B above network element 106A, in network element 106C above network element 106B) will fail because of the failed lock request. In some cases, propagating the failed lock request up the tree may ensure that all SHARP group members have made the lock request.

For example, the locking process continues, even with the failed lock request, thereby propagating the full distributed lock request to the root. Accordingly, for example, every lock request is resolved for all group members as either successful or failed (e.g., failed, in the case of the failed lock request). Propagating the full distributed lock request may mitigate or reduce potential race conditions.

In some aspects, a failed node (e.g., network element 106A) associated with the failed lock request may directly transmit a separate direct-notification to the root node (e.g., network element 106C) so that resources already held can be released as soon as possible via a collision notification sent down the tree from the root node. In an example, the root node may generate and send multiple collision notifications per lock request.

The system 100 supports tracking lock requests that cause a lock failure. In an example, lock requests that caused a lock failure are tracked by the failed lock request. Based on the tracked lock requests, a leaf node may determine when to retry a lock request. In an example, if a network element 106A attempts a lock request A in association with Reduction A tree and the lock request A fails because of a lock request B, the lock request A will store the status of lock request B at the leaf nodes of the tree that correspond to the lock request A.

In some aspects, lock requests that manage to lock the tree may track the failed lock request for notification on lock release. For example, if a successful lock by the lock request B causes the lock request A to fail, each member of the SHARP group associated with the lock request B will be notified of the failure of lock request A (e.g., notified at the leaf nodes of the SHARP group). In some examples, the system 100 may notify the lock request A when a successfully acquired lock associated with the lock request B is released. Additionally, or alternatively, the system 100 may notify the lock request A when a tentative lock associated with the lock request B is released (e.g., due to a failure to tentatively lock all tree nodes in association with lock request B).

In some other aspects, if all lock requests on the way to the root node succeed (e.g., resources associated with the lock requests are successfully locked), the root node initiates a request down the tree to permanently lock the tree. For example, the root node may transmit a lock command down the tree to all child nodes (e.g., network elements 106). Accordingly, for example, if a lock request succeeds at the root node, all nodes have been successfully tentatively locked, and the lock request is guaranteed to succeed.

The additional and/or alternative aspects support features associated with lock request message types described herein. The term "lock request" may refer to a request by a network element to lock a reduction tree (e.g., lock resources of the reduction tree) for use. The term "lock response" may refer to a response by a root node (e.g., network element 106C) to the lock request, after lock requests from all child nodes (e.g., child network elements) have reached the root.

The term "collision notification" may refer to a notification generated by a network element after the network element detects an attempt by another network element to tentatively lock a tree node. The network element may send the collision notification first to the root node, and the root node may then notify the failing reduction tree of the collision notification. The root node may send collision information to the network elements of the failing reduction tree. When the node where the collision was detected receives the notification, the node may notify the root node of the winning lock request that prevented the failed lock request from gaining a tentative lock on the node where the collision occurred. For example, the node may notify the root node of the lock request for which resources are successfully locked or tentatively locked. In some cases, more than one node may detect the collision. In some aspects, one or more of the nodes may notify the winning reduction tree of the failure and/or collision information. In some cases, one (e.g., only one) of the nodes may notify the winning reduction tree.

The term "lock freed request" may refer to a notification sent by a leaf node in the reduction tree, when the leaf node frees the lock. The terms "lock freed request", "lock freed notification", "lock released message", and "lock released notification" may be used interchangeably herein.

In some example implementations, the system 100 may support lock tracking. For example, the system 100 may maintain one or more lock tracking lists. The system 100 may maintain a pending lock list and an active lock list. The pending lock list may include pending resource reservation requests (e.g., pending lock requests). The active lock list may include active resource reservations (e.g., active locks associated with a winning reduction tree).

Each leaf node (e.g., network element 106A) may maintain one or more lock tracking lists (e.g., "pending lock list", "active lock list", etc.). The "pending lock list" includes failed lock requests that are not yet to be reissued (e.g., unable to be reissued), for example, because of priority associated with the lock requests. Using the lock tracking lists described herein, the system 100 may avoid collisions between lock requests by reissuing failed lock requests based on a priority order, at instances when the system 100 identifies that reissuing the failed lock requests will not result in a collision with lock requests known by the system 100.

The "active lock list" includes a list of lock requests that are in process, either because the lock requests are next to be issued (e.g., have reached their turn to be issued based on priority order) or the lock requests were recently issued (e.g., just issued by SW). In some examples, other collisions may arise if no lock requests are started. As new collisions between lock requests occur, the system 100 may add failed lock requests associated with the collisions into the pending lock list, based on a priority order (e.g., maintain and reissue the lock requests based on a priority order), which may thereby prevent the same collision from occurring again.

According to example aspects of the present disclosure, each leaf node (e.g., network element 106A) of the reduction trees described herein may support lock tracking. For example, each leaf node may support a lock tracking structure capable of tracking information associated with detected lock requests. Examples of the tracking information may include: a SHARP request lock identifier (e.g., a hardware identifier, a 16-bit lock identifier), a unique lock identifier for software (also referred to herein as a "unique software operation identifier") (e.g., the 16-bit lock identifier might not be unique over time), a threshold maximum quantity of retries, and a quantity of retries. In some aspects, if a quantity of retries associated with a lock request equals the threshold maximum quantity of retries, the system 100 may consider the lock request (i.e., the attempt to lock the tree) to be a failure, and the system 100 may return the lock request to the requesting entity (e.g., leaf node, network element 106A). In some example implementations, returning the lock request may be implemented by a software program executed at the system 100. The lock tracking structure may be a data structure for holding a lock request. The terms "lock tracking structure" and "lock request tracking structure" may be used interchangeably herein.

Aspects of the present disclosure support lock request scheduling in association with each leaf node (also referred to herein as SHARP leaf lock request scheduling). In some aspects, lock request scheduling described herein may support one scheduling entity per data source/destination (e.g., host/HCA). In some example implementations, lock request scheduling described herein may support a quantity of N requests by each scheduling entity, where N>1.

In some examples, each scheduling entity may maintain the following queues: active locks, active lock requests, and priority sorted pending lock requests. "Active locks" may refer to locks that have been granted. "Active lock requests" may refer to active lock requests for which a response is yet to return. "Priority sorted pending lock requests" may refer to lock requests that have failed, but may still retry a lock attempt, when their dependencies have been satisfied. Aspects of the present disclosure include priority sorting of the pending lock requests based on respective "strength", where the strength may be set in the lock "tuple". References to a lock request attempting or reattempting a lock may refer to an entity (e.g., network element 106, source network device 102) transmitting or retransmitting the lock request.

According to example aspects of the present disclosure, for each active lock, the system 100 may support maintaining a list of lock requests which failed. The system 100 may support providing a notification to network elements of the communication network 104 once the active lock is released. The notification may indicate an identifier of the lock request ('lock ID') that caused the failure and a collision point. In some aspects, the collision point is the point from which another lock request (e.g., a colliding lock request) may be notified.

For a given lock request, if the lock request has not failed, the lock request is unaware of other active lock requests. Aspects of the present disclosure support notifying the lock request of failed requests (lock requests failed due to the lock request) using one or more techniques described herein. In an example, the tree is locked, and a notification request is issued to the locked tree from the root node by the failed lock request. In another example, nodes in the tree are tentatively locked. Aspects of the present disclosure include using the tentative lock as a mechanism for one tree learning about another tree. The term "notifying the lock request" may refer to notifying an entity (e.g., a leaf node, a network element 106) which initiated the lock request.

In some examples, if a lock request A fails at a node, the system 100 may support notifying lock requests that collided with lock request A of the failure (e.g., notifying network elements associated with the lock requests of the failure). For example, the lock request A may fail due to a lock held by a lock request B. The system 100 may notify the lock request B of the failure.

If the lock held by the lock request B is a full lock, the winning tree (e.g., Reduction B tree) notifies the lock request A when the lock is released. The system 100 may then remove (from a dependency list associated with lock request B) any dependencies between the lock request A and the lock request B.

If the lock held by the lock request B is a tentative lock, and the lock request B eventually fails, the winning tree (e.g., Reduction B tree) may notify the lock request A that the lock request B has failed. The system 100 may then remove (from the dependency list associated with lock request B) any dependencies between the lock request A and the lock request B. In some aspects, the system 100 may prioritize lock request A and lock request B based on respective strengths.

In response, the lock requests (e.g., network elements corresponding to the lock requests) may remove the failed lock request from a dependency list. In some aspects, a failed lock request may be unaware of a colliding tree until the colliding tree notifies the failed lock request of the failure. For example, a lock request associated with a first tree may collide with a lock request associated with second tree and collide with a lock request associated with a third tree. The lock request may win out over the second tree (e.g., successfully achieve a lock) but lose on the collision with the third tree. In some cases, the lock request may learn about the second tree (e.g., due to a notification from the second tree with respect to the failed lock request associated with the second tree) but not learn about the third tree.

When a lock request fails, the system 100 may support inserting the lock request into an ordered pending lock request list (e.g., the lock request may insert itself into the ordered pending lock request list). The system 100 may implement the lock request once dependencies of the lock request are resolved and the lock request has the highest priority among lock requests in the pending lock request list. For example, the lock request may wait on its dependencies to be resolved, and for its turn to come for making a lock request.

In some aspects, a network element associated with a lock request may respond to a notification of a failed lock attempt differently based on whether the lock request has succeeded in locking resources. For example, if a lock request associated with a first network element is successful and the first network element is notified of a failed lock request by a second network element, the first network element may record information associated with the failed lock request. When the first network element releases the lock request, the first network element may notify the second network element of the release.

In another example, a lock request A associated with the first network element may fail to lock a node because a lock request B associated with a second network element already holds a lock (e.g., a full lock or tentative lock). The first network element may send a notification, indicating the failure of the lock request A, to the second network element.

If the lock is held by the second network element and the lock request B is a full lock, and the second network element releases the lock, the second network element may send a notification (e.g., a lock freed notification) to the first network element indicating the release.

Alternatively, if the lock is held by the second network element and the lock request B is a tentative lock, and the lock request B has failed to fully lock the node (i.e., the lock request B secured tentative locks for some nodes of a tree but failed to secure a tentative lock for one or more other nodes of the tree), the second network element may send a notification (e.g., a lock failure notification) to the first network element. The notification may indicate that the lock request B did not result in a full lock of the tree. Each leaf node corresponding to the lock request A may add the lock request B to an ordered pending lock request list associated with the leaf node.

In the case of the tentative lock above, if the lock request A and the lock request B do not fully overlap (e.g., if nodes associated with the lock request A do not all overlap with nodes associated with the lock request B), each leaf node corresponding to the lock request A may record the lock request B (and dependencies between lock request B and lock request A). For instances where a leaf node A corresponding to the lock request A does not overlap a leaf node B corresponding to the lock request B, the lock request B may be inserted as a "ghost" operation into the ordered pending lock request list associated with the leaf node A. The "ghost" operation may prevent the lock request A from proceeding until the lock request B completes (e.g., assuming the lock request B has higher priority compared to the lock request A). For example, the "ghost" operation may prevent the lock request A from proceeding (e.g., prevent the first network element from resending the lock request A) until the lock request B achieves a full lock and later releases the full lock. In some aspects, the "ghost" operation will not actually initiate the lock request B.

Example implementations supported by a source network device 102A and a network element 106 are described with reference to FIGS. 6 through 17.

Figure 6:
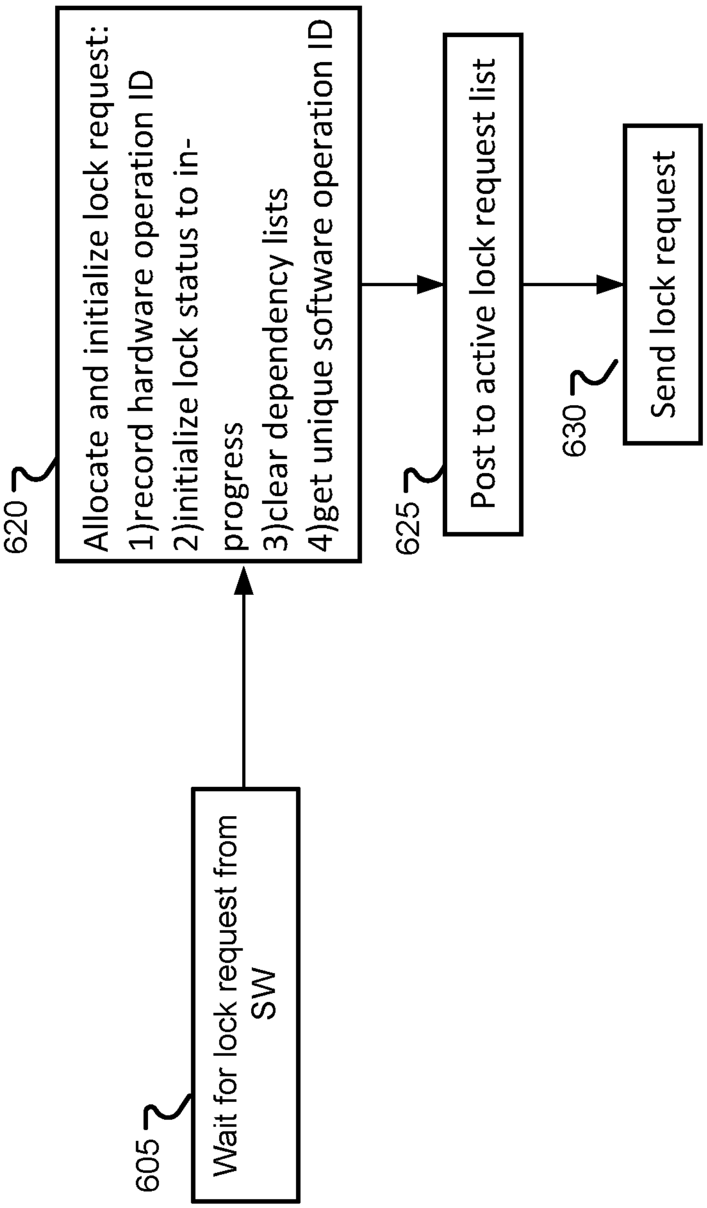
FIG. 6 is a flowchart that supports example aspects of a leaf node processing a lock initialization, in accordance with some embodiments of the present disclosure.

FIG. 6 is a flowchart 600 that supports example aspects of a leaf node (e.g., network element 106A) of the communication network 104 processing a lock initialization, in accordance with some embodiments of the present disclosure. Aspects of the flowchart 600 may be implemented by processor 206 or NEDRC 208 described with reference to FIG. 2.

The flowchart 600 may support posting a lock request received from software. For example, at 605, the leaf node may wait for incoming lock requests from software. For example, the leaf node may detect an incoming lock request from a source network device 102.

In response to detecting a lock request, then at 620, the leaf node may allocate and initialize the lock request. For example, the leaf node may record a hardware operation identifier associated with the lock request. The leaf node may initialize or set a lock status of the lock request to "in-progress". In some aspects, the leaf node may clear dependency lists associated with the lock request. A dependency list may include a list of collisions. The list of collisions may include lock requests having priority over the lock request (e.g., lock requests that need to be completed before the lock request can be re-started). The dependency list may include a list of lock requests that need to be notified on completion of the lock request (e.g., for cases in which the lock request is the winning lock request in a corresponding collision).

At 620, the leaf node may acquire a unique software operation identifier for the lock request. For example, the leaf node may acquire the unique software operation identifier from a software operation. In some aspects, the unique software operation identifier may be appended to the end of the hardware operation identifier. Aspects of the operations at 620 may support ensuring that the data format associated with the lock request is proper for the system 100 (e.g., a suitable data format for providing a lock request). The terms "lock status" and "lock request status" may be used interchangeably herein.

At 625, the leaf node may add or post the lock request to a list of active requests (also referred to herein as "active lock request list").

At 630, the leaf node may send the lock request up the reduction tree. For example, the leaf node may send the lock request to the root node (e.g., network element 106C) of the reduction tree. The leaf node may send the lock request via network elements 106A and network elements 106B.

Accordingly, for example, aspects of the flowchart 600 support features for propagating lock requests up the reduction tree, the first time each lock request is detected/received. The system 100 may propagate lock requests up the tree, independent of whether a pending request exists or not. Aspects of propagating the lock requests up the tree support detecting as many collisions as possible, the first time a lock request associated with a leaf node and a source network device 102 is detected/received, thereby preemptively identifying any potential collisions for future instances of the lock request by the same source network device 102. In some cases, collisions can occur between lock requests that do not overlap at a given leaf node. If a lock request A and a lock request B only partially overlap at the leaf nodes, when reordering operations based on priority, aspects of the present disclosure support considering both the lock request A and the lock request B, even on the leaf nodes that do not overlap.

Figure 7:
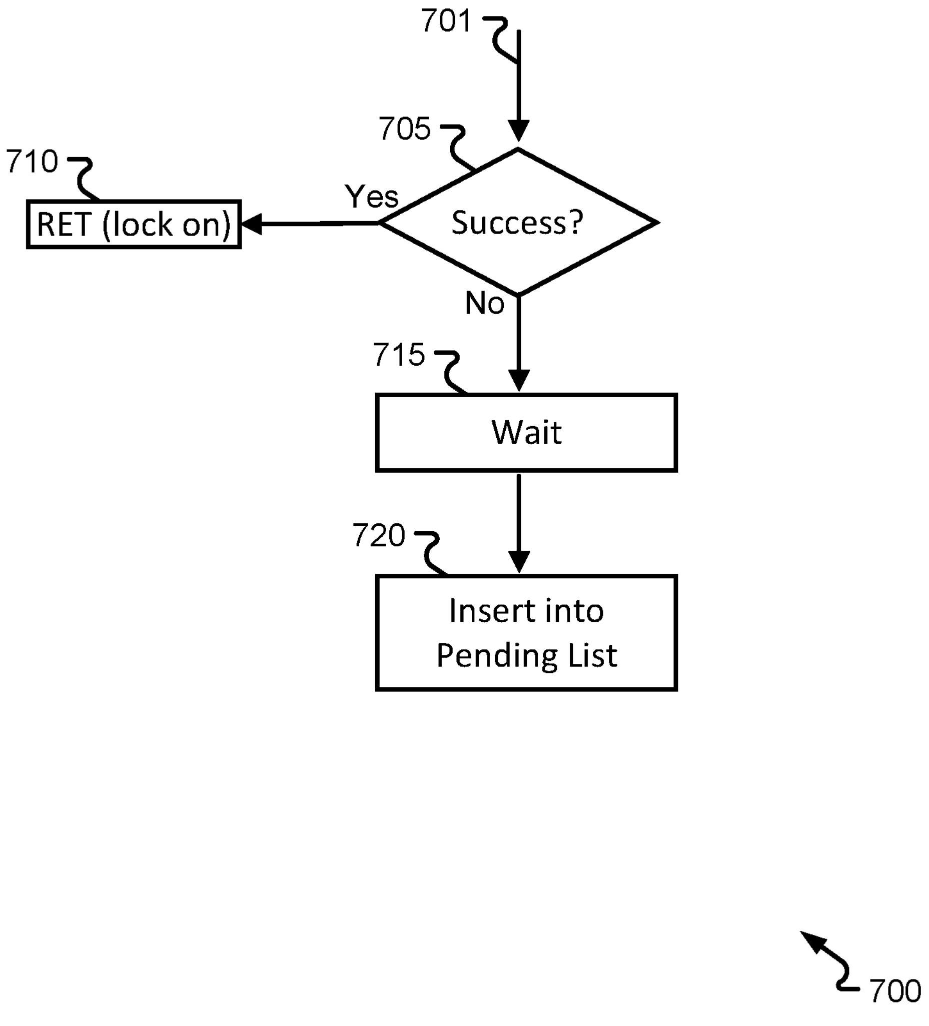
FIG. 7 is a flowchart that supports example aspects of a leaf node processing a lock response, in accordance with some embodiments of the present disclosure.

FIG. 7 is a flowchart 700 that supports example aspects of a leaf node (e.g., network element 106A) of the communication network 104 processing a lock response, in accordance with some embodiments of the present disclosure. Aspects of the flowchart 700 may be implemented by processor 206 or NEDRC 208 described with reference to FIG. 2.

At 705, the leaf node may receive a lock response 701 indicating whether a lock request is successful. The lock response 701 may include an indication of whether the lock request 701 has been granted. In some aspects, the leaf node may receive multiple lock responses 701 from respective network elements of the tree.

In an example, the lock response 701 may include an indication that the lock request is successful (e.g., a corresponding network element has allocated the resources). The leaf node may add the successful lock request to a list of active locks. In an alternative example, the lock response 701 may include an indication that the lock request is unsuccessful (e.g., the corresponding network element has failed to allocate the resources). In some cases, such a lock response 701 (lock request unsuccessful) may include a collision notification.

If the lock response 701 indicates the lock request is successful ('Yes'), then at 710, the leaf node may notify network elements of the communication network 104 that the lock has been granted. For example, the leaf node may return control to the processor of the leaf node. The leaf node may send a parameter (Lock-On) with the return.

If the lock response 701 indicates the lock request is unsuccessful ('NO'), then at 715, the leaf node may wait for additional lock responses 701 from respective network elements of the tree. For example, the leaf node may wait on all collision notifications. Based on lock responses 701 indicating an unsuccessful lock request (e.g., lock responses 701 including a collision notification), the leaf node may determine collision information associated with the unsuccessful lock request. The collision information may include a total quantity of collisions (lock failures) associated with the unsuccessful lock request. The collision information may include identification information of lock requests that have already locked resources requested by the unsuccessful lock request.

At 720, the leaf node may insert the lock request into a pending lock list. For example, the leaf node may add the unique operation identifier (e.g., unique software operation identifier) to the pending lock list.

The pending lock list may include a list of all pending lock requests (i.e., failed lock requests). The pending lock list may include a list of lock requests that collide with the pending lock requests. The lock requests indicated as colliding with the pending lock requests may include active lock requests and lock requests in progress (i.e., not locked yet, but not failed yet). In some aspects, the leaf node may record the colliding active lock requests in association with the unsuccessful lock request. When the leaf node detects that the colliding active lock requests are cleared, the leaf node may again initiate the lock request.

Figure 8:
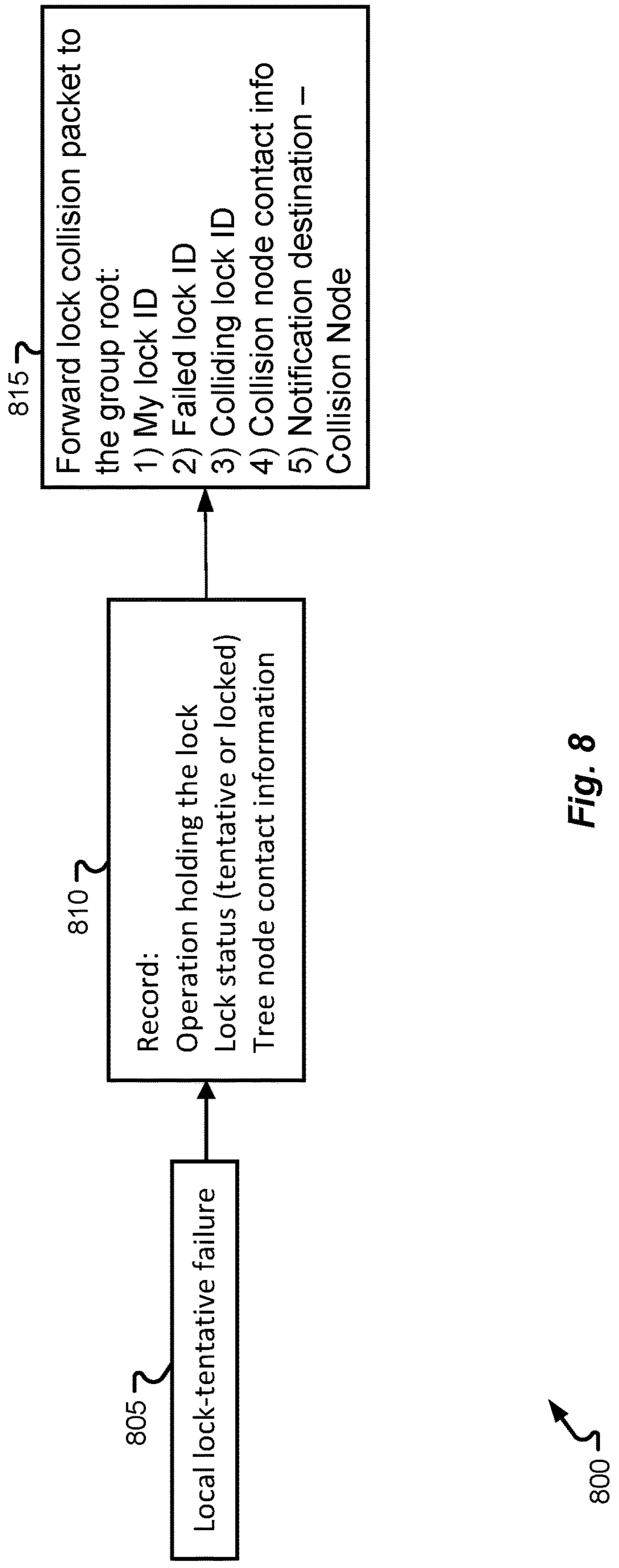
FIG. 8 is a flowchart that supports example aspects of a leaf node processing a lock request failure, in accordance with some embodiments of the present disclosure.

FIG. 8 is a flowchart 800 that supports example aspects of a leaf node (e.g., network element 106A) of the communication network 104 processing a lock request failure, in accordance with some embodiments of the present disclosure. Aspects of the flowchart 800 may be implemented by processor 206 or NEDRC 208 described with reference to FIG. 2.

At 805, the leaf node may fail when attempting to secure a tentative lock of a node as part of a lock request (i.e., a lock request failure). In some aspects, the lock request failure may be a tentative lock request failure (e.g., a tentative failure of a local lock). The term "tentative lock request failure" may include a lock request failure in which a colliding lock request results in a failure to fully lock a tree (i.e., lock all branches of the tree in association with a lock request). In some aspects, a "tentative lock request failure" may include a lock request failure in which a colliding lock request is a tentative lock request (i.e., the lock request has been initiated but not yet succeeded).

At 810, the leaf node may record information associated with the colliding lock request. For example, the recorded information may include identification information of an operation holding the lock. In some aspects, the recorded information may include a lock status (e.g., tentative or locked) of resources associated with the colliding lock request. A "tentative lock" may indicate that another network element has initiated a lock request for the resources, but that the resources have not yet been locked in association with the lock request (e.g., the lock request has been granted as "tentative"). Alternatively, a "lock" may indicate that the resources are presently locked and in use in association with the colliding lock request.

The recorded information may include tree node contact information. The tree node contact information may include an indication of which nodes of the tree to notify of the collision between lock requests. Accordingly, for example, the leaf node records which other nodes are involved in the collision and can provide a notification (e.g., a lock collision packet) to the tree indicating the same.

At 815, the node where the failure occurred may forward the lock collision packet to the root node of the tree. For example, the node where the failure occurred may send the lock collision packet to the root node, via network elements located between the node where the failure occurred and the root node. The lock collision packet may include data associated with a lock request holding the lock. The lock collision packet may include data associated with a colliding lock request and the node where the failure occurred.

In an example, the lock collision packet may include data indicating a lock identifier associated with the lock request (also referred to herein as "my lock ID") and a lock identifier of the failed lock request (also referred to herein as "failed lock ID"). In some aspects, the lock colliding packet may include data indicating a lock identifier associated with the colliding lock request (also referred to herein as "colliding lock ID") and contact information of the node associated with the colliding lock (also referred to herein as "collision node contact information"). The lock collision packet may include data indicating destination information (also referred to herein as "notification destination"). For example, the destination information may indicate the node where the collision occurred.

As described with reference to FIG. 8, a node where a tentative lock attempt failed (e.g., network element 106A) may send a collision notification message up a reduction tree (e.g., Reduction A tree), via interior nodes of the reduction tree. The interior nodes may forward the collision notification message to the root node of the reduction tree. In response to receiving the collision notification message, the root node may send collision information down the reduction tree. The node where the tentative lock attempt failed and the interior nodes may send the collision notification message in a data packet (e.g., a lock collision packet described herein). In an example, the root node may distribute a collision notification message down the reduction tree. Example aspects of the collision notification message are later described with reference to FIG. 9.

Figure 9:
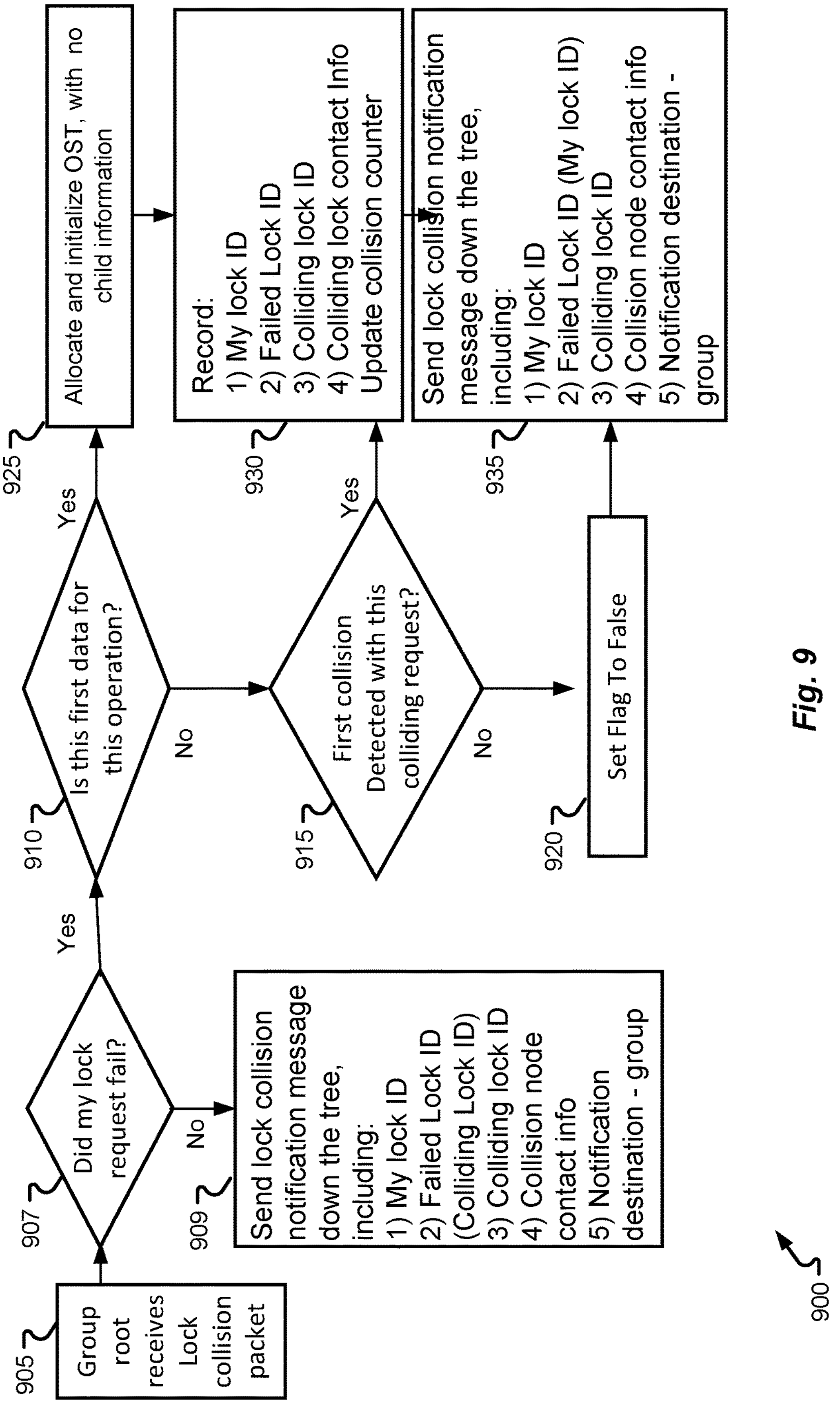
FIG. 9 is a flowchart that supports example aspects of a root node responding to a failed lock notification, in accordance with some embodiments of the present disclosure.

FIG. 9 is a flowchart 900 that supports example aspects of a root node (also referred to herein as a "group root node") (e.g., network element 106C of FIG. 1) of the communication network 104 responding to a failed lock notification, in accordance with some embodiments of the present disclosure. Aspects of the flowchart 900 may be implemented by processor 206 or NEDRC 208 described with reference to FIG. 2.

At 905, the root node may receive a lock collision packet. For example, the root node may receive the lock collision packet from a leaf node, via one or more interior nodes. The lock collision packet may include an indication of a lock request, an operation (e.g., a reduction operation) associated with the lock request, and a source network device associated with the lock request.

At 907, the root node may determine, from data included in the lock collision packet, whether a lock request by the root node has failed (e.g., "Did my lock request fail?").

If the root node determines at 907 that the lock request by the root node has not failed ('No'), then at 909, the root node may send a collision notification message (also referred to herein as a "lock collision notification message") down the tree.

In an example, the root node may include at least one of the following in the collision notification message sent at 909: identifier associated with the lock request (also referred to herein as "my lock ID"), a lock identifier associated with the failed lock request (also referred to herein as "failed lock ID"), and contact information of the node associated with the colliding lock (also referred to herein as "colliding lock contact information").

The collision notification message sent at 909 may further include an identifier of a node that will notify the colliding tree of the collision. In an example, the notification destination may include an indication of a group (or group root node) corresponding to the losing tree.

In an example, since the lock request by the root node succeeded at 907, the lock identifier associated with the failed lock request (also referred to herein as "failed lock ID") is the lock identifier associated with the colliding lock request (also referred to herein as "colliding lock ID").

Accordingly, for example, at 909, the root node may update the list of lock requests to provide a notification (e.g., a lock freed notification) when the root node releases a winning lock held by the root node.

If the root node determines at 907 that the lock request by the root node has failed ('Yes'), then at 910, the root node may determine whether the lock collision packet is first data that the root node has received with respect to the operation. For example, the root node may determine whether the lock collision packet is the first time that a node (e.g., interior node, source network device 102, etc.) has notified the root node about the operation.

The lock collision packet may include an indication of a collision between the lock request by the root node and another lock request. At 915, the root node may determine whether the first data is the first instance that the root node has been notified about the collision. If 'Yes', the root node may provide a notification to the lock request associated with the collision, and the notification may include data indicating the collision (and lock failure). The root node may provide a release command to the tree associated with the failed lock request. The release command may include a request to release any locked resources.

In some aspects, the system 100 may set a 'first collision notification' flag to 'True' or 'False'. The 'first collision notification' may be a flag indicating whether the indication of the collision is the first time that the root node has been notified of a collision between the two lock requests. In the event the root node receives a subsequent lock collision packet indicating the same collision between the two lock requests, the root node may update the tree associated with the failed lock request about the failure. The root node may provide a release command to the tree, requesting for the tree to release any new locks the failed lock request may have acquired (i.e., the failed lock request may be an in-progress failing request).

For example, at 920, the system 100 may set the 'first collision notification' flag to 'False'. The system 100 may update a collision notification message (to be later sent at 935) to indicate that the collision between the two lock requests (i.e., the failed lock request and the request causing the failure).

If the root node determines at 910 that the lock collision packet is first data that the root node has received with respect to the operation ('Yes'), then at 925, the root node may allocate and initialize OST. In some examples, the root node may allocate and initialize OST, without indicating child information (e.g., child network elements). The "OST" is a data structure that tracks a single SHARP operation in a node. For example, the OST supports tracking of how many children have arrived, buffers associated with the children, progress associated with an operation, or the like.

At 930, the root node may record data included in the lock collision packet. The data may include one or more portions of the data described with reference to 815 of FIG. 8. For example, the root node may record at least one of the following: identifier associated with the lock request (also referred to herein as "my lock ID"), identifier associated with a failed lock request (also referred to herein as "failed lock ID"), a lock identifier associated with the colliding lock request (also referred to herein as "colliding lock ID"), and contact information of the node associated with the colliding lock (also referred to herein as "colliding lock contact information"). In some aspects, at 930, the root node may set the 'first collision notification' flag to 'True'.

At 935, the root node may distribute a collision notification message down the reduction tree. In some aspects, the collision notification message may include one or more portions of the data included in the lock collision packet received at 905 or the data recorded at 930.

In an example, the root node may include at least one of the following in the collision notification message: identifier associated with the lock request (also referred to herein as "my lock ID"), an identifier associated with a failed lock request (also referred to herein as "failed lock ID"), a lock identifier associated with the colliding lock request (also referred to herein as "colliding lock ID"), and contact information of the node associated with the colliding lock (also referred to herein as "collision node contact information"). The collision notification message may include the value (e.g., 'True' or 'False') of the 'first collision notification' flag.

In an example, since the lock request by the root node failed at 907, the lock identifier associated with the failed lock request (also referred to herein as "failed lock ID") is the lock identifier associated with the lock request by the root node (also referred to herein as "my lock ID"). The collision notification message may further include an identifier of a node that will notify the colliding tree of the collision. In an example, the notification destination may include an indication of a group (or group root node) corresponding to the losing tree.

Figure 10A:
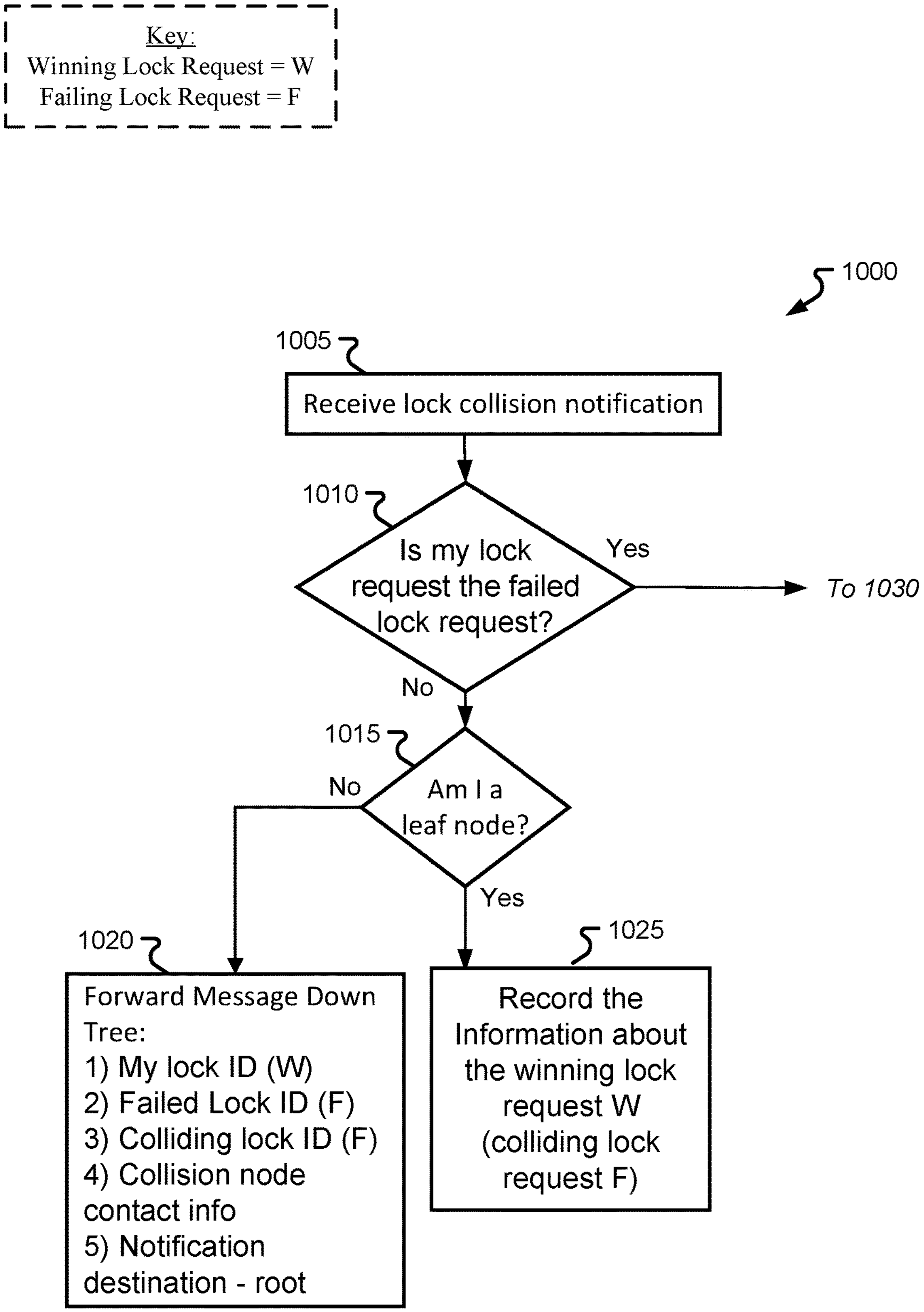
FIGS. 10A and 10B illustrate a flowchart that supports example aspects of a tree node responding to a collision notification message, in accordance with some embodiments of the present disclosure.
Figure 10B:
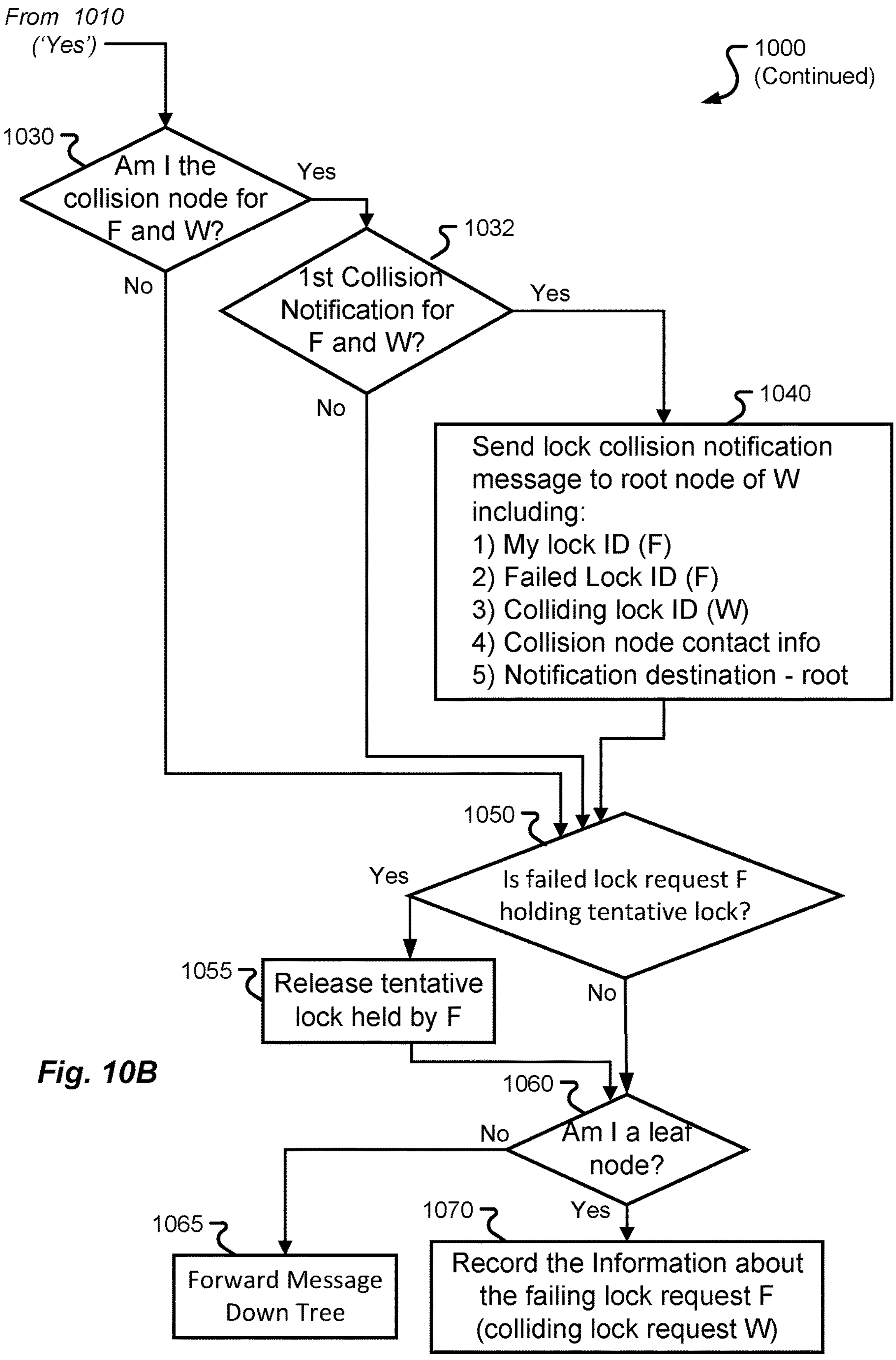

FIGS. 10A and 10B illustrate a flowchart 1000 that supports example aspects of a tree node (e.g., network element 106A, network element 106B of FIG. 1) of a tree responding to a collision notification message, in accordance with some embodiments of the present disclosure. Aspects of the flowchart 1000 may be implemented by processor 206 or NEDRC 208 described with reference to FIG. 2.

With reference to the flowchart 1000, aspects of a tree node (e.g., network element 106A, network element 106B of FIG. 1) are described in which the tree node may be in a tree that a failed lock request is attempting to lock or in a tree owned by (locked by) a winning lock request. A lock request in the failing tree will cause the winning lock request to be notified of the failed lock request, release any tentative locks associated with the failed lock request, and update the failed lock request (in the pending lock list) with the dependency on the winning lock request. A lock request in the winning tree will update the winning request (e.g., a fully locked request, a request in-progress, a request moved to the pending lock list, or a completed lock request) such that the winning lock request may notify the failed lock request when the winning lock request releases resources locked by the winning lock request.

At 1005, the node may receive a collision notification message initiated by a root node. In an example, the node may receive the collision notification message from the root node, via another tree node (e.g., a network element 106B). The collision notification message may include aspects of the collision notification message described with reference to 935 of FIG. 9. For example, the collision notification message may include an indication of a collision between a lock request by the node and another node.

At 1010, the node may identify, from the data included in the collision notification message, whether the lock request by the node is the failed lock request or the winning lock request.

If the node determines at 1010 that the lock request is successful (Is my lock request the failed lock request?='No'), the node may determine (at 1015) whether the node is a leaf node (e.g., a network element 106A as illustrated in FIG. 1).

If the node determines at 1015 that the node is not a leaf node ('NO'), the node may forward (at 1020) the collision notification message down the tree (e.g., to child nodes of the node). In some examples, the collision notification message may include an identifier of In an example, the node may include at least one of the following in the collision notification message forwarded at 1020: identifier associated with the lock request (also referred to herein as "my lock ID (W)"), a lock identifier associated with the failed lock request (also referred to herein as "failed lock ID (F)"), a lock identifier associated with the colliding lock request (also referred to herein as "colliding lock ID (F)") and contact information of the node associated with the colliding lock (also referred to herein as "colliding lock contact information").

The collision notification message forwarded at 1020 may further include an identifier of a node that will notify the colliding tree of the collision. In an example, the notification destination may include an indication of a root node corresponding to the losing tree.

Alternatively, if the node determines at 1015 that the node is a leaf node ('YES'), the node may record (at 1025) the information provided in the collision notification message (e.g., information about the winning lock request "W" and/or information about the colliding failed lock request "F").

Alternatively, if the node determines at 1010 that the lock request is unsuccessful (lock status failed='Yes'), the node may determine (at 1030) whether the node is a collision node for a winning lock request 'W' and a failed lock request 'F'. For example, 1030 may include a determination of whether the node is the node at which the collision occurred.

If the node determines at 1030 that the node is the collision node ('Yes'), the node may determine (at 1032) whether the lock collision notification received at 1005 is the first notification of the collision. That is, for example, the node may determine (at 1032) whether the collision has previously been reported and/or whether the node has previously been notified of the collision. Alternatively, if the node determines at 1030 that the node is not the collision node ('No'), the node may proceed to 1050.

If the node determines at 1032 that the lock collision notification received at 1005 is the first notification of the collision ('Yes'), the node may send (at 1040) a lock collision notification message to the root node of the winning lock request. In an example, the lock request by the node is the failed lock request, and the lock request (colliding lock request) by the other node is the winning lock request. The lock collision notification message may include data including at least one of the following: identifier associated with the lock request by the node (also referred to herein as "my lock ID (F)"), "failed lock ID (F)", identifier associated with the lock request by the other node (also referred to herein as "colliding lock ID (W)"), contact information of the other node (also referred to herein as "collision node contact info"), and a notification destination ('root'). Accordingly, for example, the node may provide a notification indicating, to the winning tree, that the node is the colliding node.

At 1050, the node may determine whether the locked resources are tentatively locked for the failed lock request.

If the node determines at 1050 that the locked resources are tentatively locked ('Yes'), the node may (at 1055) release the tentative lock. At 1060, the node may determine whether the node is a leaf node (e.g., a network element 106A as illustrated in FIG. 1).

Alternatively, if the node determines at 1050 that the locked resources are not tentatively locked ('No'), the node may determine (at 1060) whether the node is a leaf node.

If the node determines at 1060 that the node is not a leaf node ('NO'), the node may forward (at 1065) the collision notification message down the tree (e.g., to child nodes of the node). Alternatively, if the node determines at 1060 that the node is a leaf node ('YES'), the node may record (at 1070) information about the failed lock request. For example, the node may record the information about the failed lock request (e.g., lock request identifier) with the failed lock request and information about the colliding lock request (e.g., winning lock request).

Figure 11A:
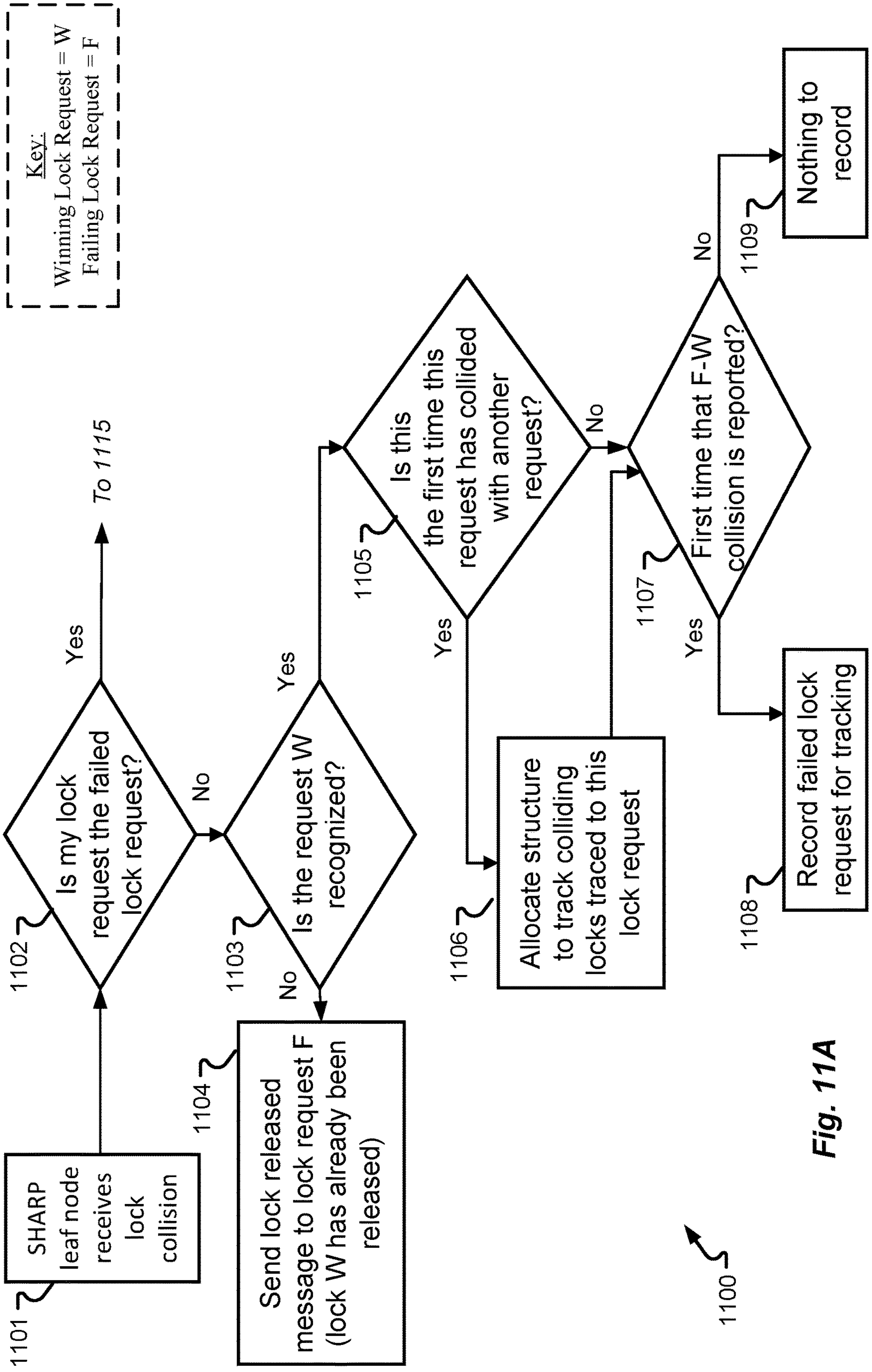
FIGS. 11A and 11B illustrate a flowchart that supports example aspects of a leaf node recording a lock collision notification, in accordance with some embodiments of the present disclosure.
Figure 11B:
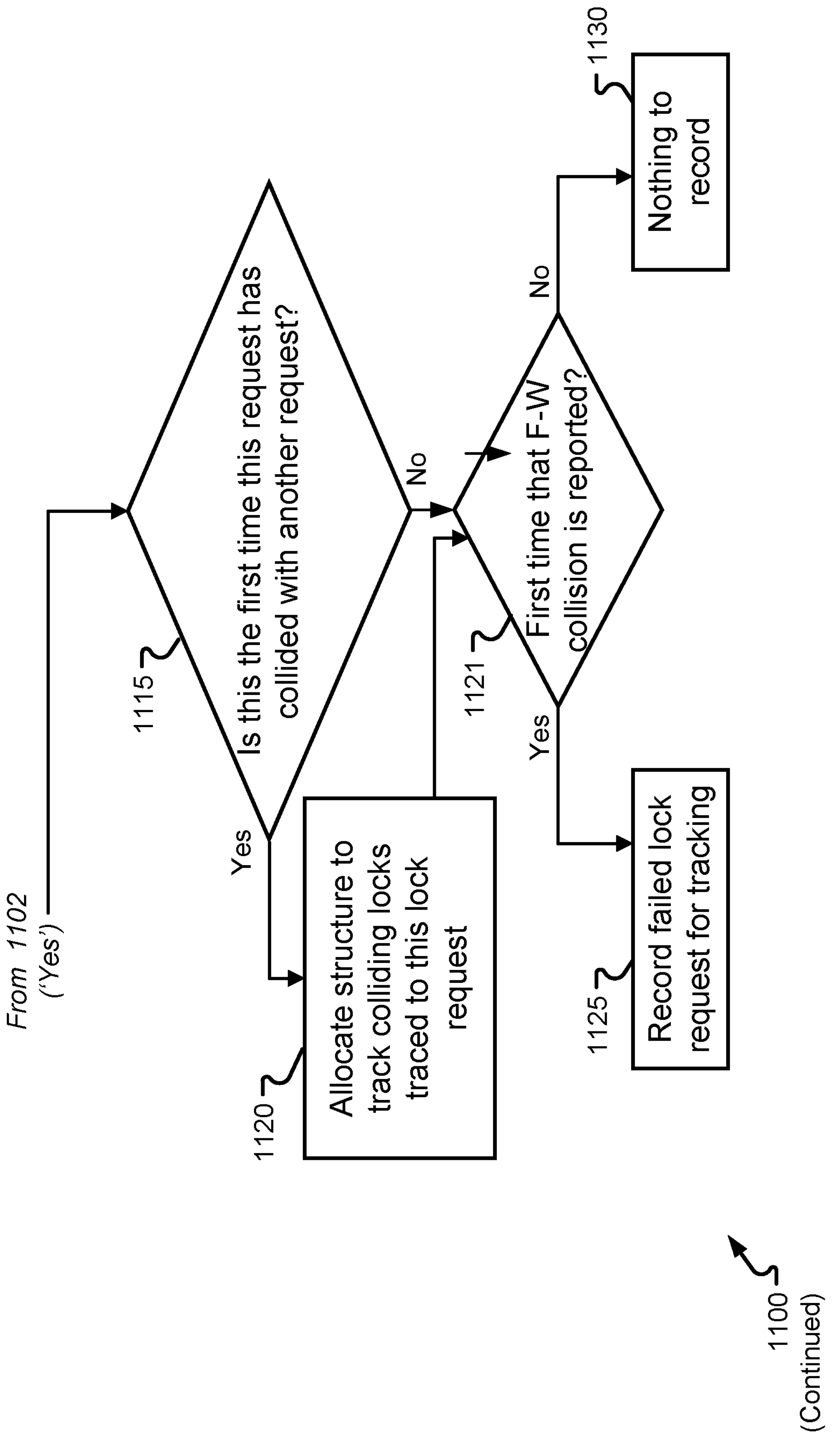

FIGS. 11A and 11B illustrate a flowchart 1100 that supports example aspects of a leaf node (e.g., network element 106A of FIG. 1) of the communication network 104 recording a lock collision notification, in accordance with some embodiments of the present disclosure. Aspects of the flowchart 1100 may be implemented by processor 206 or NEDRC 208 described with reference to FIG. 2.

With reference to the flowchart 1100, aspects of one or more operations by a leaf node of a tree for a winning lock request "W" are described.

At 1101, the leaf node receives a collision notification message (also referred to herein as a lock collision notification). If the tree associated with the leaf node is of depth 1, the leaf node will also be a root node, and thus the leaf node may receive the message from itself. The collision notification message may include aspects of the collision notification message described with reference to 935 of FIG. 9 and 1020 and 1065 of FIGS. 10A and 10B. For example, the collision notification message may include an indication of a collision between a lock request by the leaf node and another node.

At 1102, the leaf node may identify, from the data included in the collision notification message, whether the lock request by the leaf node is the failed lock request or the winning lock request.

If the leaf node determines at 1102 that the lock request by the leaf node is successful (i.e., the lock request by the leaf node is the winning lock request "W") (Is my lock request the failed lock request?='No'), the leaf node may proceed to 1103.

At 1103, the leaf node may determine whether the lock request by the leaf node (i.e., the winning lock request "W") is recognized by the leaf node. For example, the leaf node may consider the lock request as "recognized" if the lock request is in one of the following lock lists: pending requests, active requests, or locked requests. In an example case, the leaf node may remove the lock request from any of the lock lists (e.g., pending locks, active requests) if the leaf node gives up on a lock attempt (or reattempt) associated with the lock request and passes the lock request back to SW. In another example case, the leaf node may remove the lock request from any of the lock lists (e.g., locked requests) in response to releasing resources associated with the lock request.

If the leaf node determines at 1103 that the lock request by the leaf node is not recognized ("Is the request W recognized?=NO), the leaf node may proceed to 1104. At 1104, the leaf node may send a lock released message to the failed lock request "F". The lock released message may include data indicating that the lock associated with the winning lock request "W" has already been released.

If the leaf node determines at 1103 that the lock request by the leaf node is recognized ("Is the request W recognized?=Yes), the leaf node may proceed to 1105. At 1105, the leaf node may determine whether the lock request by the leaf node has previously collided with another lock request (i.e., "Is this the first time this request has collided with another request?").

If the leaf node determines at 1105 that the lock request by the leaf node has previously collided with another lock request (i.e., "Is this the first time this request has collided with another request?"=Yes), the leaf node may proceed to 1106. At 1106, the leaf node may allocate a lock tracking structure to the lock request by the leaf node. The lock tracking structure may support tracking colliding locks traced to the lock request by the leaf node. Example aspects of the lock tracking structure are described herein.

If the leaf node determines at 1105 that the lock request by the leaf node has not previously collided with another lock request (i.e., "Is this the first time this request has collided with another request?"=No), the leaf node may proceed to 1107. At 1107, the leaf node may determine whether a collision between the lock requests by the leaf node and the other node ((e.g., a winning lock request 'W' and a failed lock request 'F') has previously been reported.

If the leaf node determines at 1107 that a collision between the lock request by the leaf node and the lock request by the other node has previously been reported (i.e., "First time that F-W collision is reported?"=Yes), the leaf node may proceed to 1108. At 1108, the leaf node may record the lock request by the other node (i.e., the failed lock request) for tracking.

If the leaf node determines at 1107 that a collision between the lock request by the leaf node and the lock request by the other node has not previously been reported (i.e., "First time that F-W collision is reported?"=No), the leaf node may refrain from recording the lock request by the other node.

If the leaf node determines at 1102 that the lock request by the leaf node is successful (i.e., the lock request by the leaf node is the winning lock request "W") (Is my lock request the failed lock request?='Yes'), the leaf node may proceed to 1115. At 1115, the leaf node may determine whether the lock request has previously collided with another lock request (i.e., "Is this the first time this request has collided with another request?").

If the leaf node determines that the lock request has previously collided with another lock request (i.e., "Is this the first time this request has collided with another request?"=Yes), then at 1120, the leaf node may allocate a lock tracking structure described herein to track colliding locks traced to the lock request (the failed lock request). The lock tracking structure may support tracking winning locks traced to the lock request (the failed lock request).

Alternatively, if at 1115 the leaf node determines that the failure is not the first time the winning lock request has caused the lock request to fail ('No'), the leaf node may determine (at 1121) whether it is the first time that the collision between the two lock requests has been reported If the leaf node determines at 1121 that it is the first time that the collision between the two lock requests has been reported ('Yes'), the leaf node may (at 1125) record the failed lock request for tracking. Alternatively, if the leaf node determines at 1121 that it is not the first time that the collision between the two lock requests has been reported ('No'), the leaf node may (at 1130) refrain from rerecording the failed lock request for tracking (e.g., 'Nothing to record').

Accordingly, for example, aspects of the system 100 described herein support monitoring all collisions that happen between lock requests. For example, a collision between lock requests corresponding to different respective lock requests (e.g., lock request A and lock request B) my occur more than once due to overlaps between nodes of the reduction trees.

In an example, a given lock request (e.g., a failed lock request) originating from a leaf node may have multiple collisions with another lock request (e.g., a winning lock request), and the leaf node may receive multiple collision notification messages indicating the collision between the lock request and the other lock request. The system 100 may support recording the collision (e.g., allocating the lock tracking structure at 1120) once, while refraining from recording the collision for additional instances of the collision.

Figure 12:
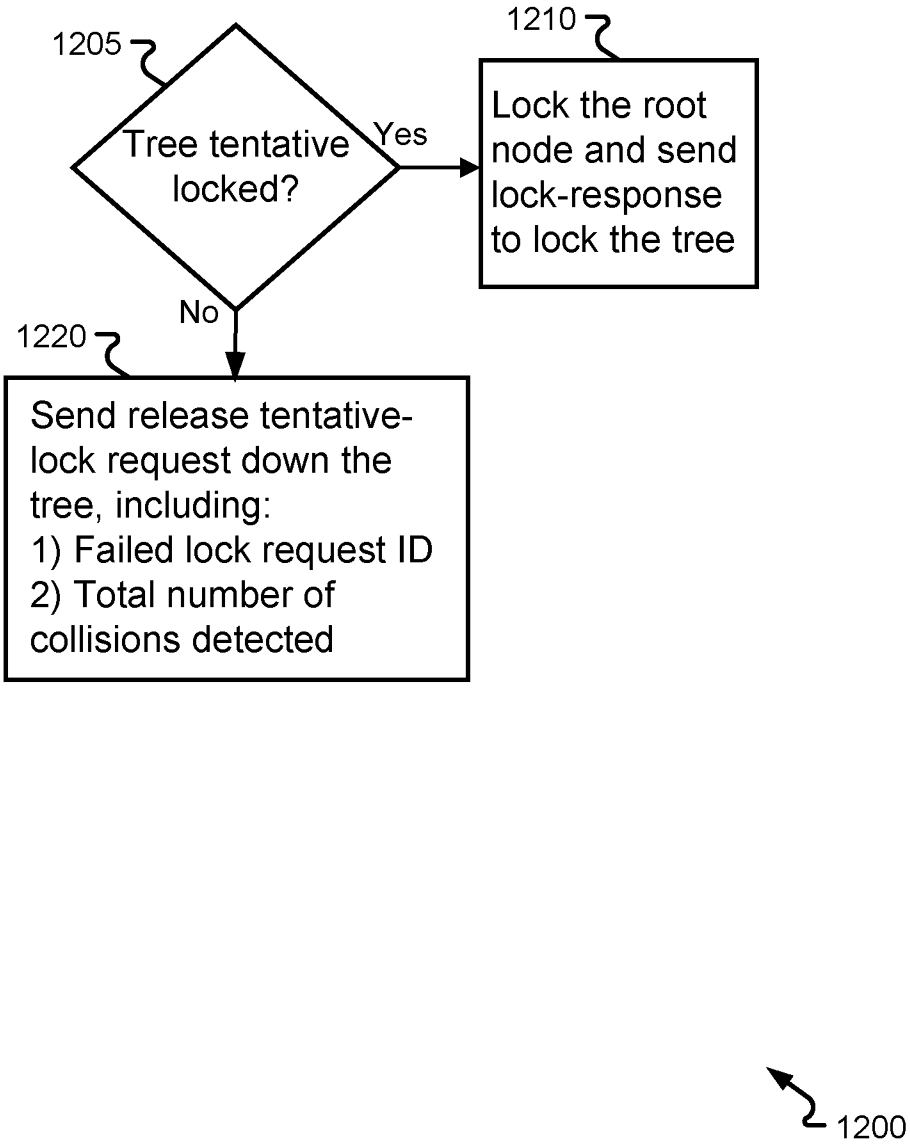
FIG. 12 is a flowchart that supports example aspects of a root node processing a lock request, in accordance with some embodiments of the present disclosure.

FIG. 12 is a flowchart 1200 that supports example aspects of a root node (e.g., network element 106C of FIG. 1) of the communication network 104 processing a lock request, in accordance with some embodiments of the present disclosure. The flowchart 1200 includes examples of a response provided by the root node. Aspects of the flowchart 1200 may be implemented by processor 206 or NEDRC 208 described with reference to FIG. 2.

At 1205, the root node may process a received lock request.

In an example, if the root node determines at 1205 that, based on the lock request, a tentative lock of the tree is achieved ('Yes') (i.e., no collision has occurred with respect to the lock request), the root node may proceed to 1210. At 1210, the root node may send a lock response to lock the tree. For example, the root node may send a lock response indicating that the lock request has succeeded, to members of the tree. In some aspects, the lock response to lock the tree may be referred to as a lock command.

If the root node determines at 1205 that, based on the lock request, a tentative lock of the tree has not been achieved ('No') (i.e., a collision has occurred with respect to the lock request), the root node may proceed to 1220. At 1220, the root node may send a release request (also referred to herein as a "release command" or a "lock release request") to release tentative locks. For example, the root node may send the release request to members of the tree. The release request may include data indicating a lock request identifier associated with the failed lock request (also referred to herein as a 'failed lock request ID'). The data may indicate a total quantity of collisions that have been detected in association with the failed lock request.

Figure 13:
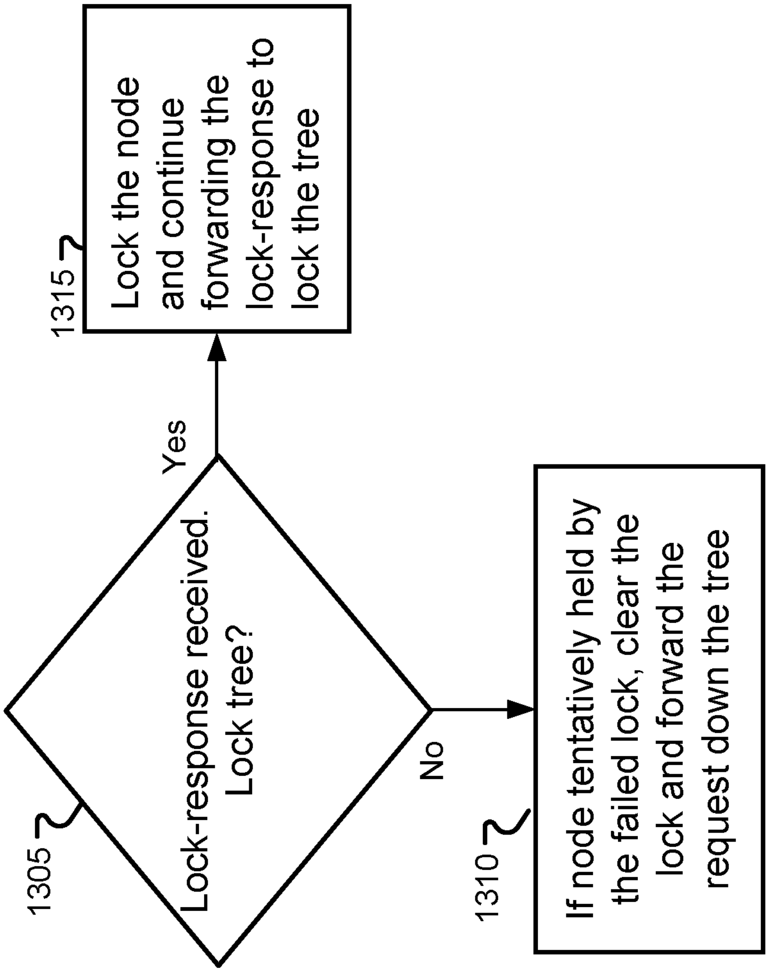
FIG. 13 is a flowchart that supports example aspects of an interior tree responding to a lock response, in accordance with some embodiments of the present disclosure.

FIG. 13 is a flowchart 1300 that supports example aspects of an interior tree node (e.g., network element 106B of FIG. 1) of the communication network 104 responding to a lock response, in accordance with some embodiments of the present disclosure. Aspects of the flowchart 1300 may be implemented by processor 206 or NEDRC 208 described with reference to FIG. 2.

The interior tree node may receive, from the root node, a notification of a status of the tree (e.g., lock failed or lock succeeded). The notification may be a lock response indicating an outcome of a lock request received at the root node. For example, the notification may be a release request (as described with reference to 1220 of FIG. 12) or a lock command (as described with reference to 1210 of FIG. 12) to lock the tree. The term "lock response" may refer to either a release request or a lock command described herein.

At 1305, the interior tree node may determine whether to lock resources associated with the interior tree node based on the notification.

For example, if the notification is a release request ("Lock tree?"="No"), then the interior tree node may proceed to 1310. At 1310, the interior tree node may unlock the resources held by the interior tree node. For example, if the resources are tentatively locked by a failed lock request, the interior tree node may clear the tentative lock. In some aspects, at 1310, the interior tree node may forward the release request down the tree (e.g., to children of the interior tree node).

Alternatively, for example, if the notification is a lock command ("Lock tree?"="Yes"), then the interior tree node may proceed to 1315. At 1315, the interior tree node may lock resources associated with the interior tree node (e.g., lock the node). In some aspects, at 1310, the interior tree node may forward the lock command down the tree (e.g., to children of the interior tree node). For example, the interior tree node may continue forwarding the lock response to lock the tree.

Figure 14:
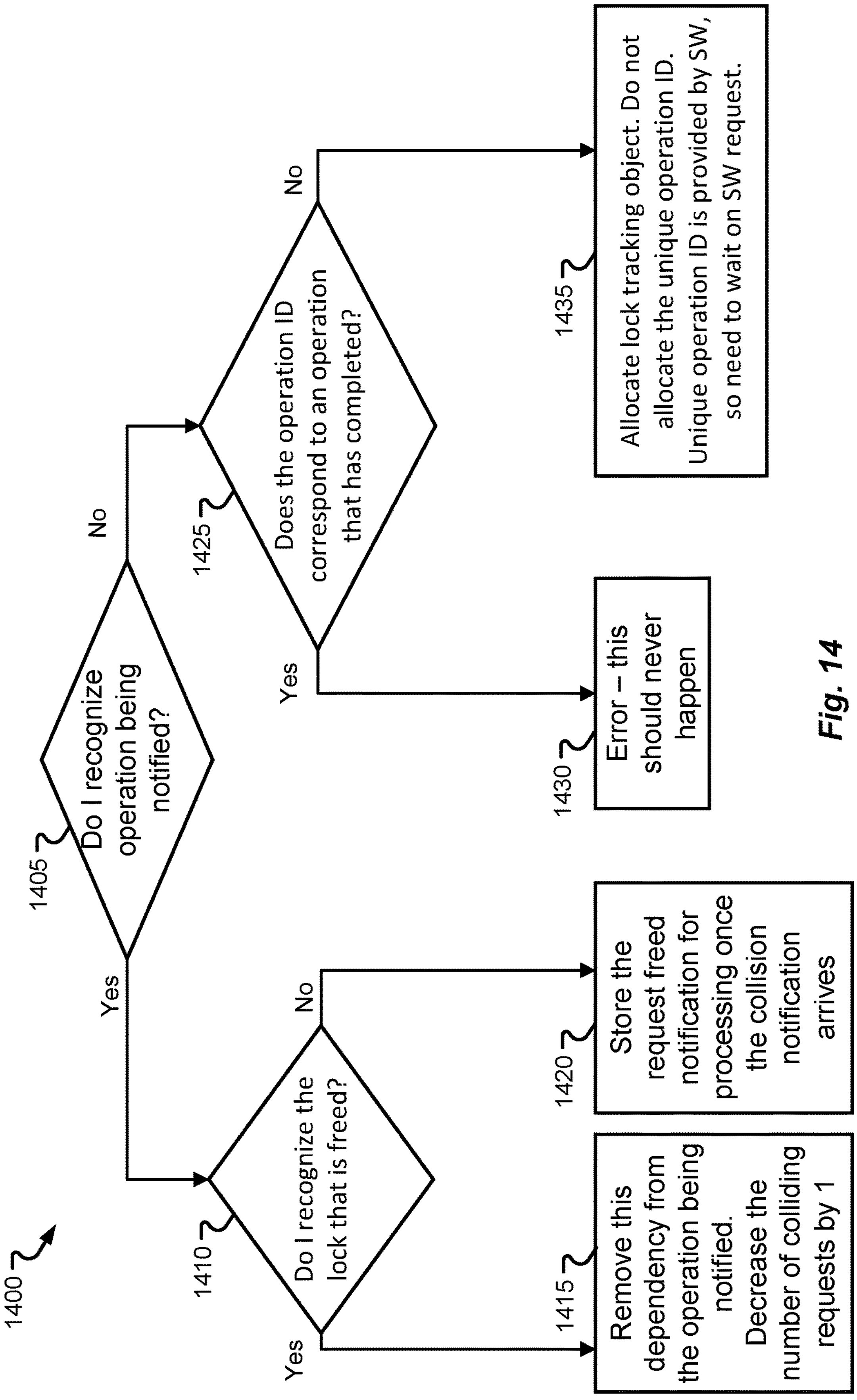
FIG. 14 is a flowchart that supports example aspects of a leaf node responding to a lock freed notification, in accordance with some embodiments of the present disclosure.

FIG. 14 is a flowchart 1400 that supports example aspects of a leaf node (e.g., network element 106A of FIG. 1) of the communication network 104 responding to a lock freed notification, in accordance with some embodiments of the present disclosure. Aspects of the flowchart 1400 may be implemented by processor 206 or NEDRC 208 described with reference to FIG. 2.

The leaf node may receive a lock release request, for example, from an interior tree node. The lock release request may include example aspects as described with reference to 1220 of FIG. 12. In some aspects, the lock release request may include an indication of an operation corresponding to the lock release request.

At 1405, the leaf node may determine whether the leaf node recognizes the operation corresponding to the lock release request. For example, the leaf node may recognize the operation based on an operation identifier corresponding to the operation.

If the leaf node recognizes the operation at 1405 ('Yes'), then at 1410, the leaf node may determine whether the leaf node recognizes the lock that is released or freed (i.e., the resources that are released) in association with the lock release request.

If the leaf node recognizes the lock at 1410 ('Yes'), then at 1415, the leaf node may remove a dependency between the operation corresponding to the release request and another operation (e.g., a lock in the pending list). In some aspects, at 1415, the leaf node may update the total quantity of colliding lock requests as tracked by the leaf node. For example, the leaf node may decrease the total quantity of colliding lock requests by 1, for the lock in the pending list.

If the leaf node does not recognize the lock at 1410 ('No'), then at 1420, the leaf node may store the lock release request. The leaf node may later process the lock release request in response to receiving a collision notification message. In an example, a lock that has caused a lock request to be put into the pending list has completed, and the lock can no longer prevent the lock request from succeeding. Other lock requests, however, may still prevent the lock request from succeeding.

Accordingly, for example, the leaf node may be notified of a lock request at 1405. At 1410, the leaf node may determine if the lock request is in a list of pending locks. If the leaf node determines at 1410 that the lock request is in the list of pending locks '(Yes'), the leaf node proceeds to 1415. At 1415, the leaf node may remove, in association with the lock request in the pending list, the dependency on the completed lock (i.e., freed lock).

If the leaf node does not recognize the operation at 1405 ('No'), then at 1425, the leaf node may determine whether the operation identifier corresponds to an operation that has already completed.

If the leaf node determines the operation identifier corresponds to an operation that has not yet completed ('NO'), the leaf node may proceed to 1435. At 1435, the leaf node may determine that the lock corresponding to the operation ID (e.g., request ID) has not yet started at the leaf node. At 1435, the leaf node may allocate a lock tracking object.

If the leaf node determines the operation identifier corresponds to an operation that has already completed ('Yes'), the leaf node may proceed to 1430. At 1430, the leaf node may determine that an error has occurred. In some aspects, the system 100 may prevent this situation from occurring.

Figure 15:
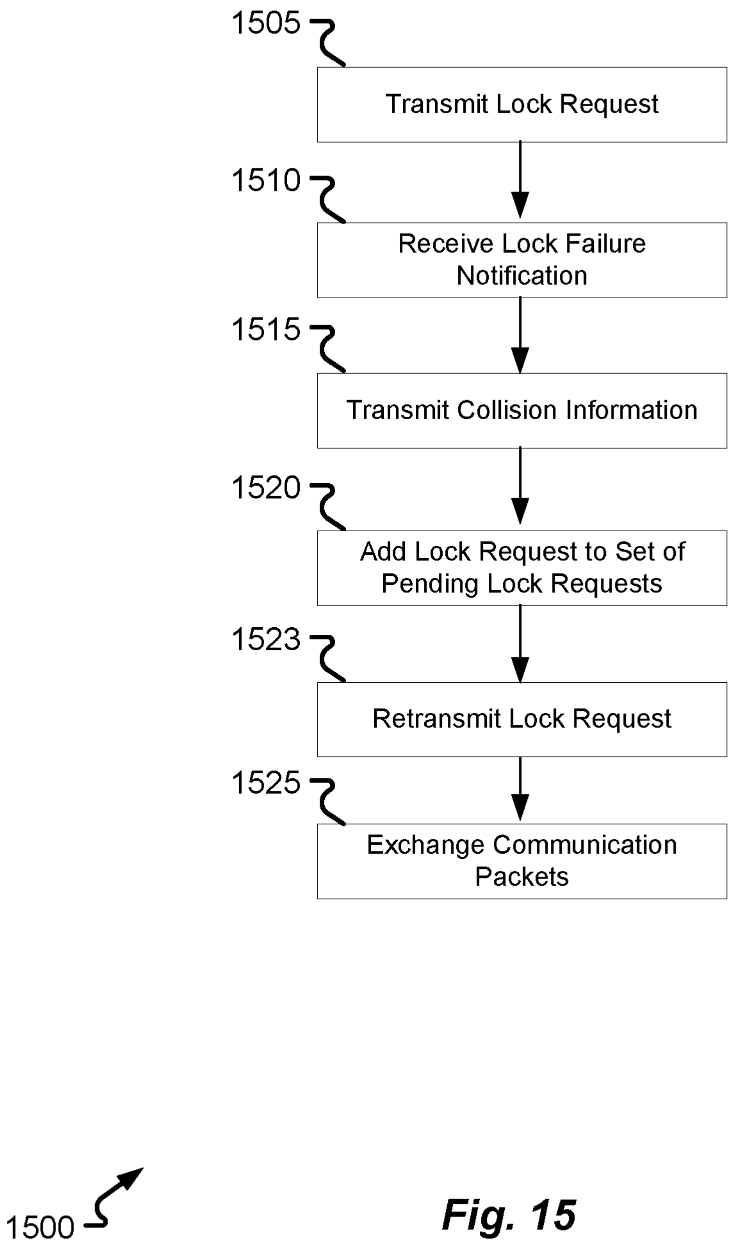
FIG. 15 illustrates an example of a process flow that supports aspects of the present disclosure.

FIG. 15 illustrates an example of a process flow 1500 that supports aspects of the present disclosure. In some examples, process flow 1500 may implement aspects of a source network device (e.g., source network device 102) described with reference to FIGS. 1 and 3. Aspects of the process flow 1500 may be implemented by one or more circuits of the source network device. For example, aspects of the process flow 1500 may be implemented by processor 310 or SDDRC 316 described with reference to FIG. 3.

In the following description of the process flow 1500, the operations may be performed in a different order than the order shown, or the operations may be performed in different orders or at different times. Certain operations may also be left out of the process flow 1500, or other operations may be added to the process flow 1500.

The source network device may include one or more ports configured for exchanging communication packets with a set of network elements over a network.

At 1505, the process flow 1500 may include transmitting a lock request. In some aspects, the lock request may include a request for at least one network element of the set of network elements to allocate resources in association with an operation of the reduction tree.

At 1510, the process flow 1500 may include receiving a lock failure notification. In some aspects, the lock failure notification indicates that one or more network elements of the set of network elements have failed to allocate the resources.

At 1515, the process flow 1500 may include transmitting collision information associated with the lock request in response to receiving the lock failure notification.

In some aspects, the collision information may include at least one of: an identifier corresponding to the lock request; and an identifier corresponding to a network element from which the source network device received the lock failure notification.

In some aspects, the collision information may include an indication of an existing lock of the resources. In some aspects, the existing lock corresponds to a second lock request received from a network element of the set of network elements. In some aspects, the existing lock may be a tentative lock associated with locking one or more network elements of the set of network elements. For example, in contrast to locking the full reduction tree, the existing lock may be a tentative lock of some of the network elements (nodes), and the corresponding lock request associated with the lock request is still active and could fail at a future temporal instance.

In some aspects, the collision information may include at least one of: an identifier corresponding to the second lock request; an identifier corresponding to the network element; and status information associated with the existing lock.

In some aspects, the collision information may include an indication of at least one of: an operation associated with the existing lock. In some aspects, the operation is a data reduction operation associated with the reduction tree or a second reduction tree; and a data reduction flow including the operation.

At 1520, the process flow 1500 may include adding the lock request to a set of pending lock requests. The set of pending lock requests may be included in a pending lock list, aspects of which are described herein.

At 1523, the process flow 1500 may include retransmitting the lock request based on a priority order associated with the pending lock requests. In an example implementation, the process flow 1500 includes retransmitting the lock request in response to the lock request reaching the top of the pending lock list (e.g., the lock request has the highest priority among lock requests included in the pending lock list) and all dependencies associated with the lock being satisfied.

The dependencies may include, for example, colliding lock requests that caused the lock request to fail, and the process flow 1500 includes retransmitting the lock request once all of the colliding lock requests that caused the lock request to fail have been resolved. A colliding lock request is resolved when, for example, 1) the colliding lock request fully locks the tree and subsequently releases the lock, or 2) the colliding lock request fails to lock the tree and subsequently is added to the pending lock list. In some examples, a lock request may not succeed the second time through, if there is a new request that has entered the system between the first failure and the second attempt to lock the tree.

At 1525, the process flow 1500 may include exchanging the communication packets with the set of network elements in response to a result associated with retransmitting the lock request. For example, the process flow 1500 may include exchanging the communication packets in response to locking resources associated with the lock request (e.g., the lock request is a winning lock request). For example, the process flow 1500 may include exchanging the communication packets in response to the lock request succeeding at locking the tree. Exchanging the communication packets at 1525 may include data reductions (e.g., SHARP data reduction operations) described herein. The communication packets exchanged at 1525 may include data packets associated with the processing performed by SHARP resources secured by a successful lock request.

In some aspects (not illustrated), the process flow 1500 may include transmitting an additional lock request for the operation in response to: receiving the lock failure notification; and a preset criterion associated with sending one or more additional lock requests.

In some aspects (not illustrated), the process flow 1500 may include receiving a collision indication indicating: a collision between a first lock request for a set of resources and a second lock request for the set of resources. In some aspects, the first lock request is from a first data flow, and the second lock request is from a second data flow. In an example, the collision indication may indicate a result of the collision. In some aspects, the result may include a denial of the first lock request. In an example (not illustrated), the process flow 1500 may include storing an identifier corresponding to the first data reduction flow, in response to receiving the collision indication. In some aspects, the identifier is stored to a list of data reduction flows for which a corresponding lock request was denied at least one previous lock request.

Figure 16:
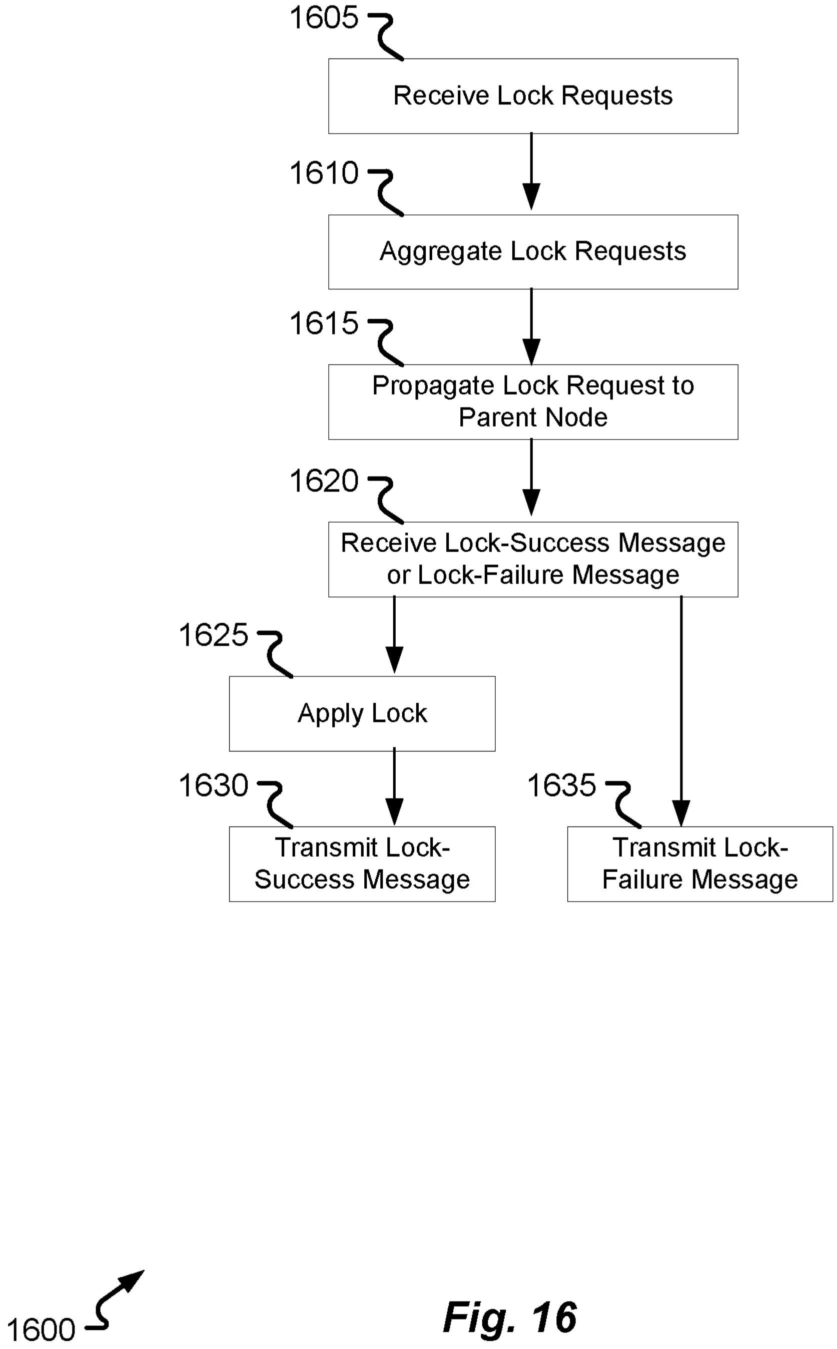
FIG. 16 illustrates an example of a process flow that supports aspects of the present disclosure.

FIG. 16 illustrates an example of a process flow 1600 that supports aspects of the present disclosure. In some examples, process flow 1600 may implement aspects of a network element (e.g., network element 106A, network element 106B) described with reference to FIGS. 1 and 2. Aspects of the process flow 1600 may be implemented by one or more circuits of the network element. For example, aspects of the process flow 1600 may be implemented by processor 206 or NEDRC 208 described with reference to FIG. 2.

In the following description of the process flow 1600, the operations may be performed in a different order than the order shown, or the operations may be performed in different orders or at different times. Certain operations may also be left out of the process flow 1600, or other operations may be added to the process flow 1600.

The network element may include one or more ports for exchanging communication packets over a network. The network element may include a processor, to perform data-reduction operations. In some aspects, each data-reduction operation is associated with a plurality of source network devices and a plurality of network elements of the network that are arranged in a respective data-reduction flow.

The network element may include a computation hierarchy database operable to indicate, for each data-reduction flow in which the network element participates, one or more child nodes and a parent node of the network element. The network element may further include at least one group of computation resources.

At 1605, the process flow 1600 may include receiving, from the one or more child nodes, lock requests defined for a data-reduction operation associated with a data-reduction flow.

At 1610, the process flow 1600 may include aggregating the received lock requests.

At 1615, the process flow 1600 may include, in response to aggregating the received lock requests, propagating a lock request to the parent node.

At 1620, the process flow 1600 may include receiving from the parent node, in response to propagating the lock request, one of (i) a lock-success message and (ii) a lock-failure message.

The process flow 1600 may include, in response to receiving the lock-success message: applying a lock (at 1625) at in favor of the data-reduction operation; and transmitting the lock-success message (at 1630) to the one or more child nodes.

The process flow 1600 may include, in response to receiving the lock-failure message, transmitting the lock-failure message (at 1635) to one or more of the child nodes.

In some aspects (not illustrated), the process flow 1600 may include, in response to receiving a lock request from the one or more child nodes: verifying whether a lock has been acquired in favor of a data reduction operation of a flow that is different from the flow associated with the received lock request; and in response to verifying that the lock exists, indicating a lock-failure to the parent node.

In some aspects (not illustrated), the process flow 1600 may include, in response to receiving a lock request from the one or more child nodes: verifying whether a previous lock request was received for a flow that is different from the flow associated with the received lock request; and in response to verifying that the previous lock request was received, transmitting a collision indication to the parent node. In some aspects, the process flow 1600 may include transmitting a lock-fail count with the collision indication.

In some aspects (not illustrated), the process flow 1600 may include tentatively allocating the at least one group of computation resources to the lock request in response to receiving a lock-request message.

In some aspects (not illustrated), the process flow 1600 may include, in response to receiving a lock-success message associated with the lock request, permanently allocating the tentatively allocated group of computation resources to the lock request.

In some aspects (not illustrated), the process flow 1600 may include, in response to receiving a lock-failure message associated with the lock request, releasing a lock associated with the tentatively allocated group of computation resources.

Figure 17:
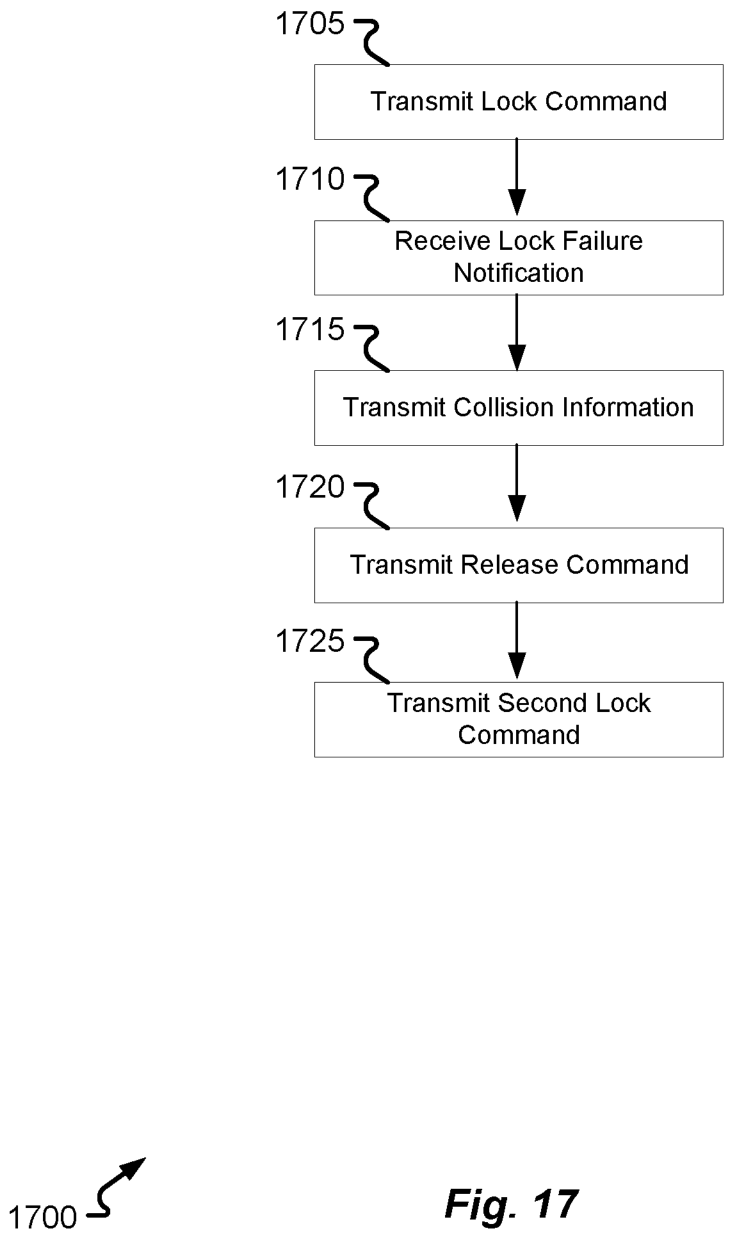
FIG. 17 illustrates an example of a process flow that supports aspects of the present disclosure.

FIG. 17 illustrates an example of a process flow 1700 that supports aspects of the present disclosure. In some examples, process flow 1700 may implement aspects of a root network element (e.g., network element 106C) described with reference to FIGS. 1 and 2.

Aspects of the process flow 1700 may be implemented by one or more circuits of the root network element. For example, aspects of the process flow 1700 may be implemented by processor 206 or NEDRC 208 described with reference to FIG. 2.

In the following description of the process flow 1700, the operations may be performed in a different order than the order shown, or the operations may be performed in different orders or at different times. Certain operations may also be left out of the process flow 1700, or other operations may be added to the process flow 1700.

The root network device may include one or more ports configured for exchanging communication packets with a set of network elements over a network.

At 1705, the process flow 1700 may include transmitting a lock command in response to receiving a lock request from a network element of the set of network elements. In some aspects, the set of network elements are included in a reduction tree associated with the network. In some aspects, the lock command may include a request for the network element or at least one other network element of the set of network elements to allocate resources in association with an operation of the reduction tree.

At 1710, the process flow 1700 may include receiving a lock failure notification from the first network element. In some aspects, the lock failure notification may include an indication that one or more network elements of the set of network elements have failed to allocate the resources.

At 1715, the process flow 1700 may include transmitting collision information associated with the lock command in response to receiving the lock failure notification.

At 1720, the process flow 1700 may include transmitting a release command. In some aspects, after a tree is successfully locked, the release command may be issued when the tree user (e.g., network element, source network device) is done using the SHARP resources for user data reductions, such as barrier, allreduce, etc.

In some aspects, the release command may include a request for the network element or the at least one other network element of the set of network elements to release the resources in association with the operation of the reduction tree.

At 1725, the process flow 1700 may include transmitting, in response to completion of the operation, a second lock command associated with a second network element and at least one failed lock request. In some aspects, transmitting the second lock command is based on a priority of the second network element with respect to respective priorities of other network elements associated with failed lock requests.

Figure 18:
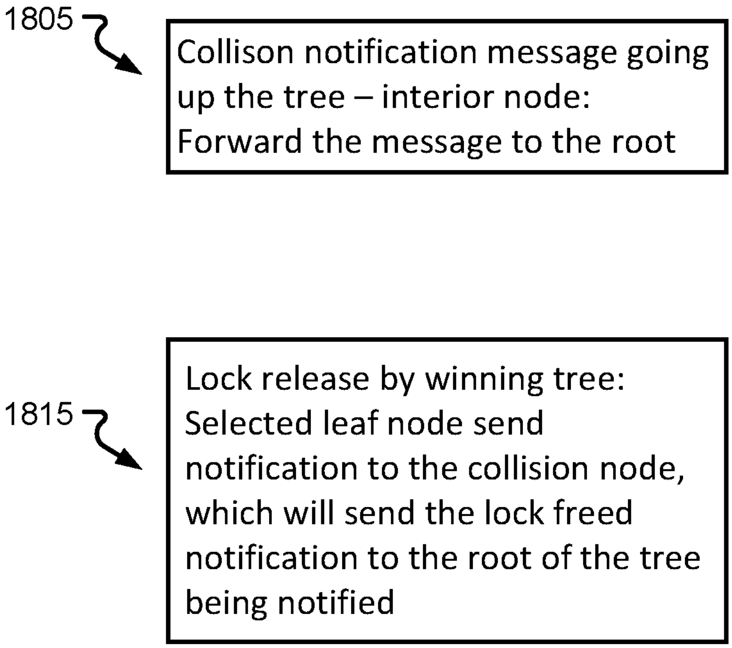
FIG. 18 illustrates examples of messages that support aspects of the present disclosure.

FIG. 18 illustrates examples of messages that support aspects of the present disclosure in association with locking a tree.

Aspects of collision notification message 1805 are described herein. When a collision occurs, and a node (e.g., network element 106A) is unable to acquire a lock at a node in the tree, the node may generate collision notification message 1805. The node may send the collision notification message 1805 to the root node of the tree, via interior nodes (e.g., network elements 106B) of the tree. The interior nodes would forward the collision notification message 1805 to the root node.

Aspects of a lock release message 1815 (also referred to herein as a lock freed notification) are described herein. When a lock (e.g., permanent or tentative) associated with a winning lock request is released, a leaf node (e.g., network element 106A) may send the lock release message 1815 to the collision node with other trees, thereby notifying all lock requests that failed due to the winning lock request. In some aspects, the failed lock requests ("losing" lock requests) are notified and may update the pending lock requests appropriately.

In some embodiments, one (e.g., only one) of the leaf nodes of the tree originates the lock release message 1815. In some examples, the leaf node that originates the collision notification message 1805 may also originate the lock release message 1815. In some aspects, propagating the lock release message 1815 to the root node includes sending (e.g., by the root node) the lock release message 1815 down the tree, releasing locks along the way, and at leaf nodes updating the active lock list and any dependencies in the pending lock list.

In an example, a locked tree (Reduction A tree) associated with a winning lock request W may release a lock after SHARP reduction operations corresponding to the lock request W have completed. One (e.g., only one) of the leaf nodes of the tree associated with the lock request W may initiate the lock release message 1815, sending the lock release message 1815 up the tree, to the root node. The lock release message 1815 notifies all failed lock requests F that collided with the winning lock request W that the lock is released. The failed lock requests F may be sitting in the pending lock request queues at the leaf nodes. The leaf nodes may update the dependencies associated with the failed lock requests F. For example, for each of the failed lock requests F, the leaf nodes may update an associated dependency list so as to remove the winning lock request W from the dependency list. A root node of the locked tree sends a notification down the locked tree, which releases the locks associated with the winning lock request W, at each node (e.g., interior nodes, leaf nodes, etc.) in the tree. At each leaf node of the locked tree, the winning lock request W is removed from an active lock request list.

Each of processors 206 (FIG. 2) and 310 (FIG. 3) typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Element of source network device 102 and network element 106, including (but not limited to) SDDRC 316 and NEDRC 208 may be implemented using suitable hardware, such as in one or more Application-Specific Integrated Circuits (ASICs) or Field-Programmable Gate Arrays (FPGAs), using software, using hardware, or using a combination of hardware and software elements.

Additional Techniques

In some embodiments, the disclosures hereinabove may be modified, for further performance improvement of the distributed computing system:

1. Allocating a node in the tree is implemented by resource allocation (instead of acquiring a lock as described above). This means that a given node in the SHARP tree may support multiple operations in parallel. The resource requirement could include items such as reduction buffers and ALUs, and in some instances could continue to be a lock. The change can be viewed as gaining access to a resource object rather than specifying the resource as a lock.
2. When a node in the tree fails to acquire the resources needed for the operation, the process of "locking" the reduction tree continues and in addition a failure notification is immediately sent up the tree to the root, which then notifies all nodes in the tree to release any resources that may have been marked as tentatively reserved. When the reservation request completes (e.g., the requests have made their way up to the root), the root still notifies the tree of failure, and any remaining allocated resources are freed.
3. When the root notifies the children of a failure, the root also adds a count of the number of unique tree collisions that have occurred. This prevents some potential race conditions.
4. In some embodiments, when a lock completes, all pending resource reservation requests with an empty strong list immediately start; in another embodiment, the requests start in a staggered way, spaced by a defined time interval and beginning with the strongest one; and, in yet another embodiment, only the strongest one on a local list of pending operations that has satisfied its known collisions (its strong list) will start. This avoids collisions that the leaf node can foresee.

Although the embodiments described herein mainly address data reduction in a distributed computing system, the methods and systems described herein can also be used in other suitable applications.

In some embodiments, a source network device described herein includes: one or more ports configured for exchanging communication packets with a set of network elements over a network; and one or more circuits to: transmit a lock request, wherein the lock request includes a request for at least one network element of the set of network elements to allocate resources in association with an operation of the reduction tree; and transmit collision information associated with the lock request in response to receiving a lock failure notification, wherein the lock failure notification indicates that one or more network elements of the set of network elements have failed to allocate the resources.

In some embodiments, the one or more circuits, in response to receiving the lock failure notification: add the lock request to a set of pending lock requests; retransmit the lock request based on a priority order associated with the pending lock requests; and exchange the communication packets with the set of network elements in response to a result associated with retransmitting the lock request.

In some embodiments, the one or more circuits transmit an additional lock request for the operation in response to:

receiving the lock failure notification; and a preset criterion associated with sending one or more additional lock requests.

In some embodiments, the collision information includes at least one of: an identifier corresponding to the lock request; and an identifier corresponding to a network element from which the source network device received the lock failure notification.

In some embodiments, the collision information includes an indication of an existing lock of the resources; and the existing lock corresponds to a second lock request received from a network element of the set of network elements.

In some embodiments, the collision information includes at least one of: an identifier corresponding to the second lock request; an identifier corresponding to the network element; and status information associated with the existing lock.

In some embodiments, the collision information includes an indication of at least one of: an operation associated with the existing lock, wherein the operation is a data reduction operation associated with the reduction tree or a second reduction tree; and a data reduction flow including the operation.

In some embodiments, the one or more circuits: receive a collision indication indicating: a collision between a first lock request for a set of resources and a second lock request for the set of resources, wherein the first lock request is from a first data flow, and the second lock request is from a second data flow; and a result of the collision, wherein the result includes a denial of the first lock request; and store an identifier corresponding to the first data reduction flow, in response to receiving the collision indication, wherein the identifier is stored to a list of data reduction flows for which a corresponding lock request was denied at least one previous lock request.

In some embodiments, a network element described herein includes: one or more ports for exchanging communication packets over a network; a processor, to perform data-reduction operations, wherein each data-reduction operation is associated with a plurality of source network devices and a plurality of network elements of the network that are arranged in a respective data-reduction flow; a computation hierarchy database operable to indicate, for each data-reduction flow in which the network element participates, one or more child nodes and a parent node of the network element; and one or more circuits to: receive, from the one or more child nodes, lock requests defined for a data-reduction operation associated with a data-reduction flow; aggregate the received lock requests; and in response to aggregating the received lock requests, propagate a lock request to the parent node.

In some embodiments, the one or more circuits receive from the parent node, in response to propagating the lock request, one of (i) a lock-success message and (ii) a lock-failure message.

In some embodiments, the one or more circuits, in response to receiving the lock-success message: apply a lock in favor of the data-reduction operation; and transmit the lock-success message to the one or more child nodes.

In some embodiments, the one or more circuits, in response to receiving the lock-failure message, transmit the lock-failure message to one or more of the child nodes.

In some embodiments, in response to receiving a lock request from the one or more child nodes, the one or more circuits: verify whether a lock has been acquired in favor of a data reduction operation of a flow that is different from the flow associated with the received lock request; and in response to verifying that the lock exists, indicate a lock-failure to the parent node.

In some embodiments, in response to receiving a lock request from the one or more child nodes, the one or more circuits: verify whether a previous lock request was received for a flow that is different from the flow associated with the received lock request; and in response to verifying that the previous lock request was received, transmit a collision indication to the parent node.

In some embodiments, the one or more circuits transmit a lock-fail count with the collision indication.

In some embodiments, the network element described herein includes at least one group of computation resources, wherein the one or more circuits: tentatively allocate the at least one group of computation resources to the lock request in response to receiving a lock-request message; in response to receiving a lock-success message associated with the lock request, permanently allocate the tentatively allocated group of computation resources to the lock request; and in response to receiving a lock-failure message associated with the lock request, release a lock associated with the tentatively allocated group of computation resources.

In some embodiments, a root network device described herein includes: one or more ports configured for exchanging communication packets with a set of network elements over a network; and one or more circuits to: transmit a lock command in response to receiving a lock request from a network element of the set of network elements, wherein: the set of network elements are included in a reduction tree associated with the network; and the lock command includes a request for the network element or at least one other network element of the set of network elements to allocate resources in association with an operation of the reduction tree; and transmit collision information associated with the lock command in response to receiving a lock failure notification from the network element.

In some embodiments, the one or more circuits transmit a release command, wherein the release command includes a request for the network element or the at least one other network element of the set of network elements to release the resources in association with the operation of the reduction tree.

In some embodiments, the lock failure notification includes an indication that one or more network elements of the set of network elements have failed to allocate the resources.

In some embodiments: the one or more circuits transmit, in response to completion of the operation, a second lock command associated with a second network element and at least one failed lock request; and transmitting the second lock command is based on a priority of the second network element with respect to respective priorities of other network elements associated with failed lock requests.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered Any of the steps, functions, and operations discussed herein can be performed continuously and automatically.

The exemplary apparatuses, systems, and methods of this disclosure have been described in relation to examples of a network element 106 and a source network device 102. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed)

by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A source network device, comprising:
one or more ports configured for exchanging communication packets with a set of network elements over a network; and
one or more circuits to:
transmit a lock request, wherein the lock request comprises a request for at least one network element of the set of network elements to allocate resources in association with an operation of a reduction tree; and
transmit collision information associated with the lock request in response to receiving a lock failure notification, wherein the lock failure notification indicates that one or more network elements of the set of network elements have failed to allocate the resources, and wherein the collision information comprises at least one of:

an identifier corresponding to the lock request; and an identifier corresponding to a network element from which the source network device received the lock failure notification.

2. The source network device according to claim 1, wherein the one or more circuits, in response to receiving the lock failure notification, are to:

add the lock request to a set of pending lock requests;

retransmit the lock request based on a priority order associated with the pending lock requests; and exchange the communication packets with the set of network elements in response to a result associated with retransmitting the lock request.

3. The source network device according to claim 1, wherein the one or more circuits are to transmit an additional lock request for the operation of the reduction tree in response to:

receiving the lock failure notification; and a preset criterion associated with sending one or more additional lock requests.

4. The source network device according to claim 1, wherein:

the collision information comprises an indication of an existing lock of the resources; and the existing lock corresponds to a second lock request from at least one other network element of the set of network elements.

5. The source network device according to claim 4, wherein the collision information comprises at least one of:

an identifier corresponding to the second lock request;

an identifier corresponding to the at least one other network element; and status information associated with the existing lock.

6. The source network device according to claim 4, wherein the collision information comprises an indication of at least one of:

a data reduction operation associated with the reduction tree or a second reduction tree; and a data reduction flow.

7. The source network device according to claim 1, wherein the one or more circuits are to:

receive a collision indication indicating:

a collision between a first lock request for a set of resources and a second lock request for the set of resources, wherein the first lock request is from a first reduction data flow, and the second lock request is from a second reduction data flow; and a result of the collision, wherein the result comprises a denial of the first lock request; and store an identifier corresponding to the first data reduction flow, in response to receiving the collision indication, wherein the identifier is stored to a list of data reduction flows for which a corresponding lock request was denied at least one previous lock request.

8. The source network device of claim 1, wherein the collision information comprises an indication of at least one of:

a data reduction operation associated with the reduction tree or a second reduction tree; and a data reduction flow.

9. A network element, comprising:

one or more ports for exchanging communication packets over a network;

a processor, to perform data-reduction operations, wherein each data-reduction operation is associated with a plurality of source network devices and a plurality of network elements of the network that are arranged in a respective data-reduction flow;

a computation hierarchy database operable to indicate, for each data-reduction flow in which the network element participates, one or more child nodes and a parent node of the network element; and one or more circuits to:

receive, from the one or more child nodes, lock requests defined for a data-reduction operation associated with a data-reduction flow;

aggregate the received lock requests;

in response to aggregating the received lock requests, propagate a lock request to the parent node; and in response to receiving a lock-success message from the parent node:

apply a lock in favor of the data-reduction operation; and transmit the lock-success message to the one or more child nodes.

10. The network element according to claim 9, wherein the one or more circuits are to receive from the parent node, in response to propagating the lock request, a lock-failure message.

11. The network element according to claim 10, wherein the one or more circuits, in response to receiving the lock-failure message, are to transmit the lock-failure message to one or more of the child nodes.

12. The network element according to claim 9, wherein, in response to receiving a lock request from the one or more child nodes, the one or more circuits are to:

verify whether a lock has been acquired in favor of a data-reduction operation of a flow that is different from the flow associated with the received lock request; and in response to verifying that the lock exists, indicate a lock-failure to the parent node.

13. The network element according to claim 9, wherein, in response to receiving a lock request from the one or more child nodes, the one or more circuits are to:

verify whether a previous lock request was received for a flow that is different from the flow associated with the received lock request; and in response to verifying that the previous lock request was received, transmit a collision indication to the parent node.

14. The network element according to claim 13, wherein the one or more circuits are to transmit a lock-fail count with the collision indication.

15. The network element according to claim 9, further comprising a group of computation resources, wherein the one or more circuits are to:

tentatively allocate the group of computation resources to the lock request in response to receiving a lock-request message;

in response to receiving a lock-success message associated with the lock request, permanently allocate the tentatively allocated group of computation resources to the lock request; and in response to receiving a lock-failure message associated with the lock request, release a lock associated with the tentatively allocated group of computation resources.

16. A root network device, comprising:

one or more ports configured for exchanging communication packets with a set of network elements over a network; and one or more circuits to:

transmit a lock command in response to receiving a lock request from a network element of the set of network elements, wherein:

the set of network elements are included in a reduction tree associated with the network; and the lock command comprises a request for the network element or at least one other network element of the set of network elements to allocate resources in association with an operation of the reduction tree; and transmit collision information associated with the lock command in response to receiving a lock failure notification from the network element, wherein:

the collision information comprises an indication of an existing lock of the resources; and the existing lock corresponds to a second lock request from the at least one other network element.

17. The root network device according to claim 16, wherein the one or more circuits are to:

transmit a release command, wherein the release command comprises a request for the network element or the at least one other network element of the set of network elements to release the resources in association with the operation of the reduction tree.

18. The root network device according to claim 16, wherein the lock failure notification comprises an indication that one or more network elements of the set of network elements have failed to allocate the resources.

19. The root network device according to claim 16, wherein:

the one or more circuits are to transmit, in response to completion of the operation of the reduction tree, a second lock command associated with a second network element and at least one failed lock request; and transmitting the second lock command is based on a priority of the second network element with respect to respective priorities of other network elements associated with failed lock requests.

* * * * *